United States Patent
Funato et al.

(10) Patent No.: US 7,574,223 B2
(45) Date of Patent: Aug. 11, 2009

(54) METHOD AND ASSOCIATED APPARATUS FOR DISTRIBUTED DYNAMIC PAGING AREA CLUSTERING UNDER HETEROGENEOUS ACCESS NETWORKS

(75) Inventors: Daichi Funato, Mountain View, CA (US); Atsushi Takeshita, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 41 days.

(21) Appl. No.: 11/230,422

(22) Filed: Sep. 19, 2005

(65) Prior Publication Data

US 2006/0025161 A1   Feb. 2, 2006

Related U.S. Application Data

(62) Division of application No. 10/185,240, filed on Jun. 28, 2002.

(60) Provisional application No. 60/327,097, filed on Oct. 4, 2001.

(51) Int. Cl.
*H04Q 7/22* (2006.01)

(52) U.S. Cl. .................. 455/458; 455/436; 455/567; 455/459; 455/440

(58) Field of Classification Search .................. 455/515, 455/456.1, 458
See application file for complete search history.

(56) References Cited

U.S. PATENT DOCUMENTS

| 5,361,396 | A | 11/1994 | Onoe et al. |
| 5,548,816 | A * | 8/1996 | DeVaney .................. 455/456.2 |
| 5,621,784 | A | 4/1997 | Tiedemann et al. |
| 5,875,400 | A | 2/1999 | McCarthy |
| 6,101,388 | A | 8/2000 | Keshavachar |
| 6,745,039 | B1 | 6/2004 | Di Lalia |
| 7,164,926 | B2 | 1/2007 | Papadimitriou et al. |
| 2003/0145092 | A1 | 7/2003 | Funato et al. |

FOREIGN PATENT DOCUMENTS

| EP | 1 071 304 A1 | 1/2001 |
| JP | H08-503588 | 4/1996 |
| JP | H09-507005 | 7/1997 |
| JP | 09-261159 | 10/1997 |
| JP | 2001-520816 | 10/2001 |

(Continued)

OTHER PUBLICATIONS

W. Fenner, "Internet Group Management Protocol." Version 2. Nov. 1997, Xerox PARC. 24 pages.

(Continued)

*Primary Examiner*—Charles N Appiah
*Assistant Examiner*—Randy Peaches
(74) *Attorney, Agent, or Firm*—Blakely, Sokoloff, Taylor & Zafman LLP

(57) ABSTRACT

In a telecommunication system, paging areas may be automatically reconfigured as required. Paging areas can be adaptively reconfigured in accordance with changes in movement traffic of mobile hosts. The system and method work under a constraint that only a limited number of area IDs are permitted for each paging unit area. Also, the system and method work over heterogeneous access networks. Thus, according to the presently disclosed embodiments, paging areas reconfigure themselves according to changes in movement traffic of mobile hosts.

3 Claims, 28 Drawing Sheets

FOREIGN PATENT DOCUMENTS

| WO | WO 94/16529 | 7/1994 |
|----|-------------|--------|
| WO | WO 01/65885 A1 | 7/2001 |

OTHER PUBLICATIONS

European Search Report, Feb. 3, 2006.

Voloshynovskiy et al. "Method for adaptive digital watermarking robust against geometric transforms". European patent submission PCT/IB2000/01089, filed Aug. 3, 2000. WO/2002/013138. Accepted May 2001.

Petitcolas et al. "Attacks on copyright marking systems", in David Aucsmith (Ed), Information Hiding, Second International Workshop, IG '98, Portland, Oregon, USA. Apr. 15-17, 1998. Proceedings, LNCS 1525, Springer-Verlag, ISBN 3-540-65386-4. pp. 219-239.

Pereira et al. "Fast robust template matching for affine resistant watermarks", Lecture notes in Computer Science: Third International Workshop on Information Hiding, Springer. vol. 1768, pp. 199-210, 1999.

Bas et al. "Robust watermarking based on warping of predefined regular triangular patterns". Proceedings of SPIE: Security and Watermarking of Multimedia Content II, San Jose, CA USA, Jan. 2000.

Dugelay et al. "Image watermarking: possible counterattacks against random geometric distortions". Proceedings of SPIE: Security and Watermarking of Multimedia Content II, vol. 3971, pp. 24-26, San Jose, CA USA Jan. 2000.

Rhoads. "Steganography systems". International Patent WO96/36163 PCT/US96/06618. Nov. 1996.

Lin et al. "Rotation, scale, and translation resilient public watermarking for images". Proceedings of SPIE: Security and Watermarking of Multimedia Content II, vol. 3971, pp. 90-98. San Jose, CA USA, Jan. 2000.

Voloshynovskiy et al. "Content adaptive watermarking based on a stochastic multiresolution image modeling", EUSIPC02000, X European Signal Processing Conference, Tampere, Finland, Sep. 2000.

Kutter. "Watermarking resistant to translation, rotation and scaling". SPIE International Symposium on Voice, Video, and Data Communication, Nov. 1998.

Voloshynovskiy et al. "Optimal adaptive diversity watermarking with state channel estimation". Proceedings of SPIE: Security and Watermarking of Multimedia Content III, vol. 4314, pp. 22-25. San Jose, CA USA, Jan. 2001.

Akyildiz, Ian F. et al., A Dynamic Location Management Scheme for Next-Generation Multitier PCS Systems, IEEE Translations on Wireless Communications, vol. 1, No. 1, 2002, pp. 178-189.

Haartsen, Jaap C., "The Bluetooth Radio System", IEEE Personal Communications, 2000, pp. 28-36.

Pollini, Gregory P. et al., "A Profile-Based Location Strategy and Its Performance", IEEE Journal on Selected Areas in Communications, vol. 15, No. 8, 1997, pp. 1415-1424.

Ramjee, R. et al., "IP Paging Service for Mobile Hosts", ACM Sigmobile, 2001, pp. 332-344.

Rose, Christopher, "State-Based Paging/Registration: A Greedy Technique", IEEE Transactions on Vehicular Technology, vol. 13, No. 5, 1995, pp. 880-892.

Tabbane, Sami, "An Alternative Strategy for Location Tracking", IEEE Journal on Selected Areas in Communications, vol. 13, No. 5, 1995, pp. 880-892.

Tabbane, Sami, "Location Management Methods for Third-Generation Mobile Systems", IEEE Communications Magazine, 1997, pp. 72-84.

Wang, Tsan-Pin, "Registration Area Planning for PCS Networks using Genetic Algorithms", IEEE Translations on Vehicular Technology, vol. 47, No. 3, 1998, pp. 987-995.

Kemp, J., Sun Microsystems Manual Titled "Document Mode Host Altering ("IP Paging") Problem Statement", dates Jun. 2001, pp. 1-14.

Kemp, J., et al., Sun Microsystems Manual Titled "Requirements and Functional Architecture for an IP Host Alerting Protocol", dated Aug. 2001, pp. 1-16.

Perkins, C. IBM Manual Titled "IP Mobility Support" dated Oct. 1996, pp. 1-79.

Madhavapeddy, Seshu et al., "The Design of Self Engineering Mobile Telephone Systems", ISS '95 World Telecommunications Congress (International Switching Symposium) Advanced Switching Technologies for Universal Telecommunications at the Beginning of the 21$^{st}$ Century, Berlin. Apr. 23-28, 1995. Proceedings of the International Swit, vol. 1, Symp. 15, Apr. 23, 1995, pp. 426-430. ISBN: 3-8007-2093-0.

Partial European Search Report in corresponding European Application No. EP 02022238, dated Sep. 10, 2003, 5 pages.

* cited by examiner

CELL ⊂ PAGING AREA ⊂ LAST HOP SUBNET

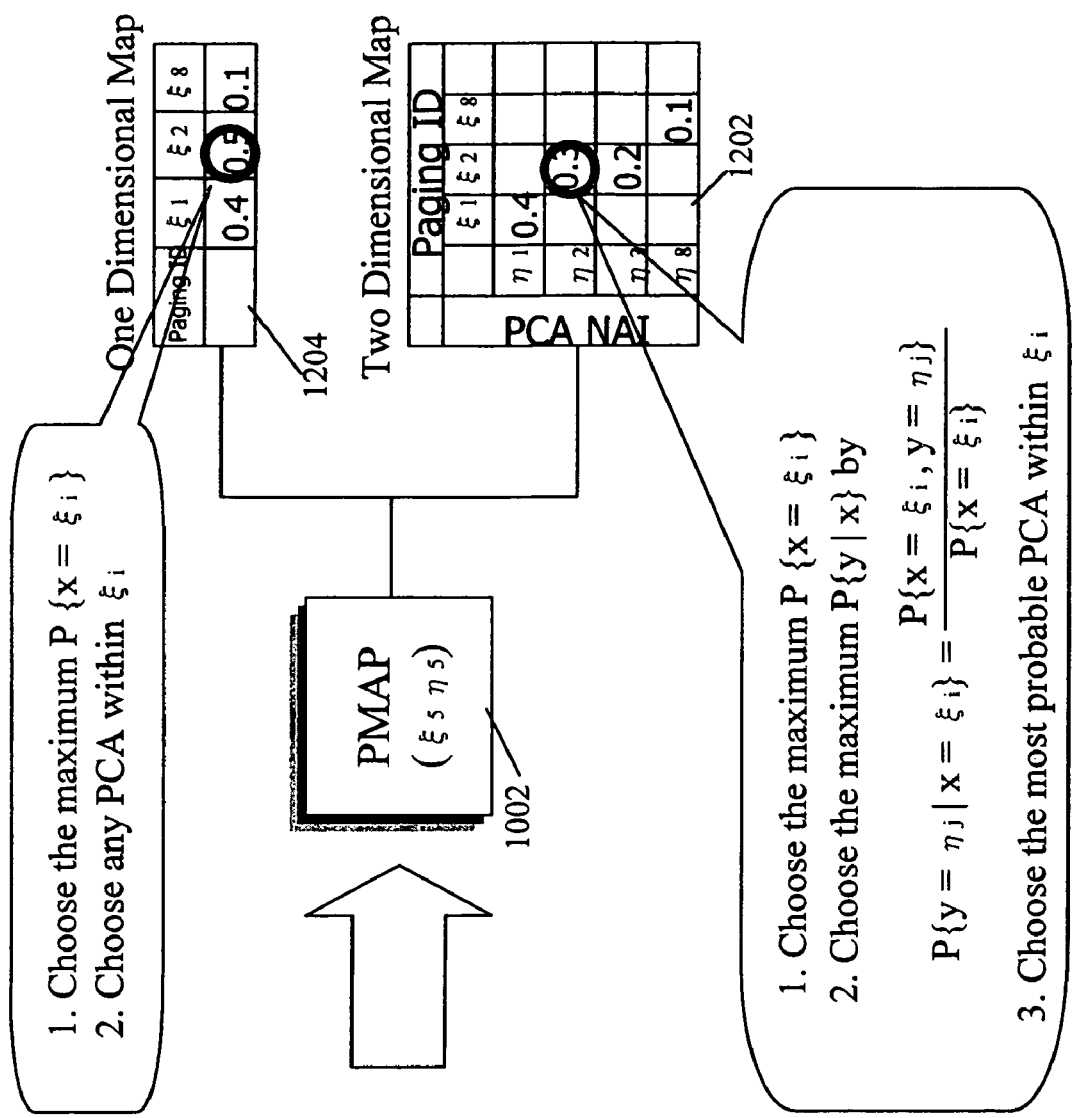
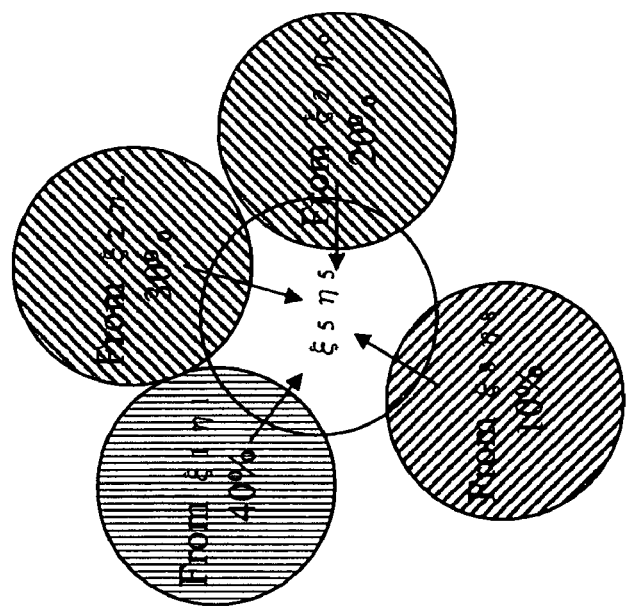
FIG. 12

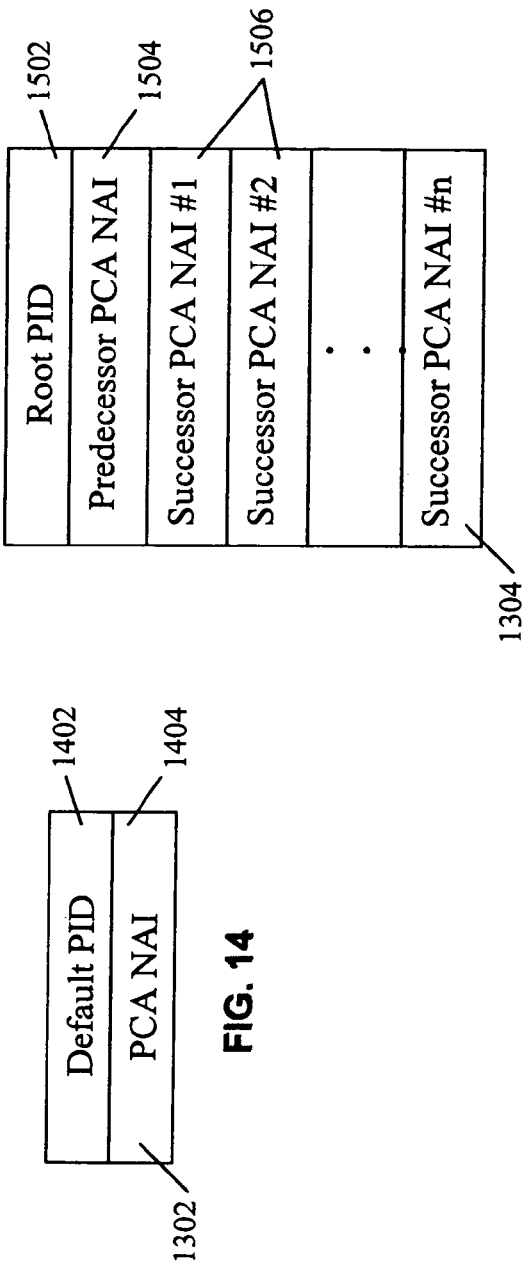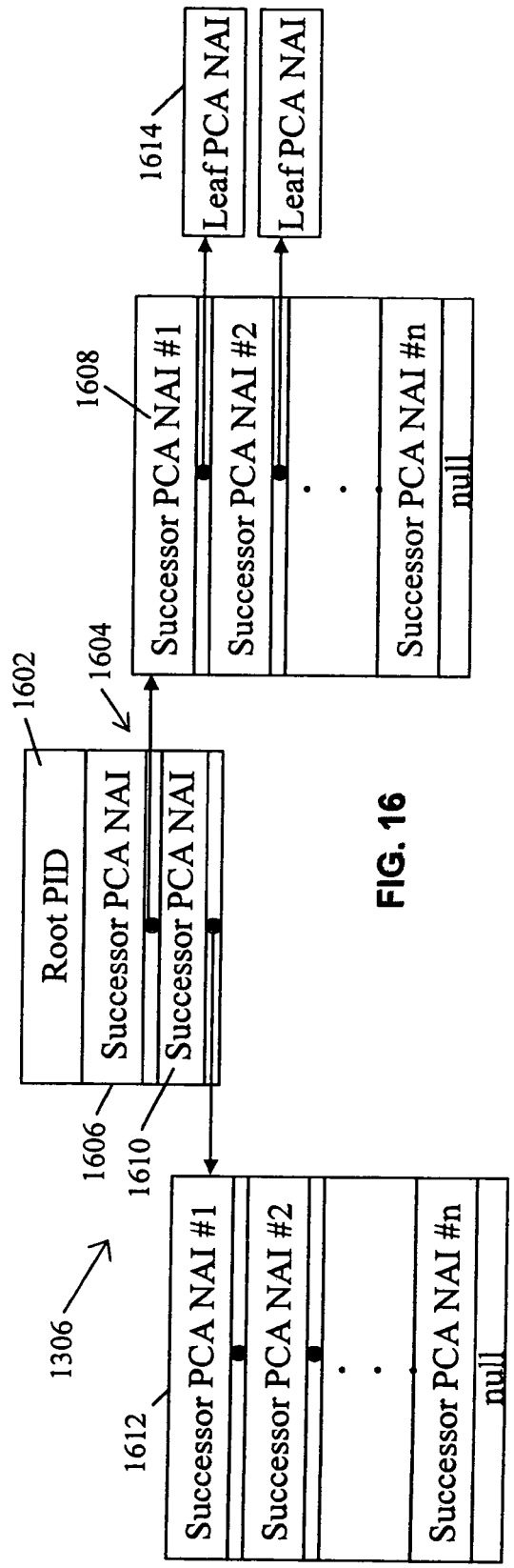
FIG. 14
FIG. 15
FIG. 16

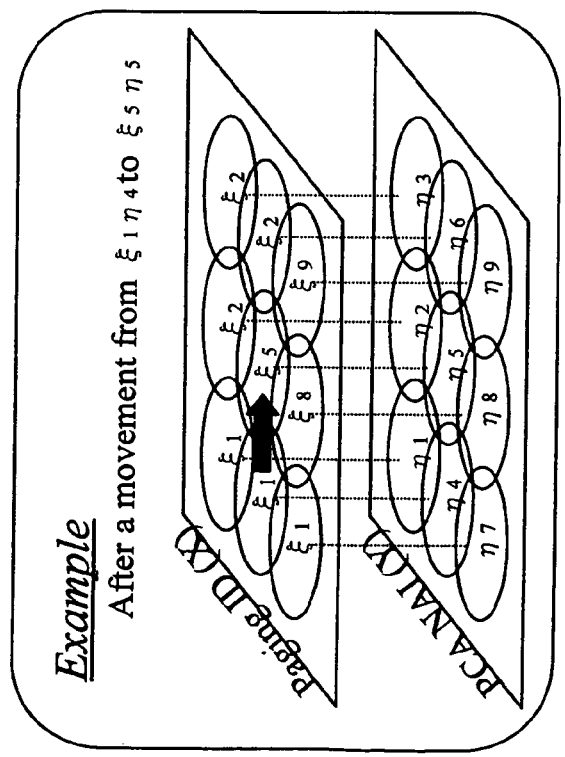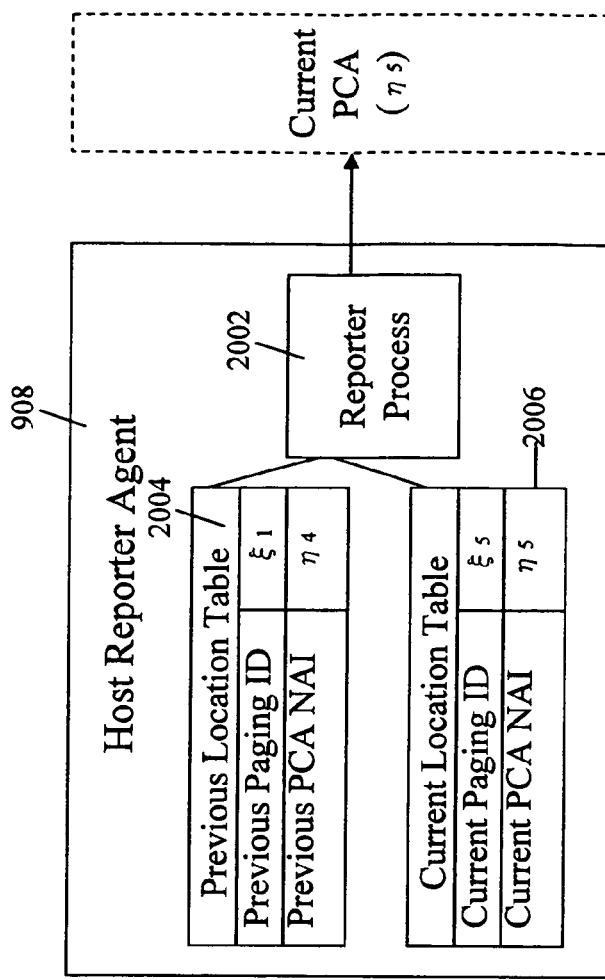
FIG. 20

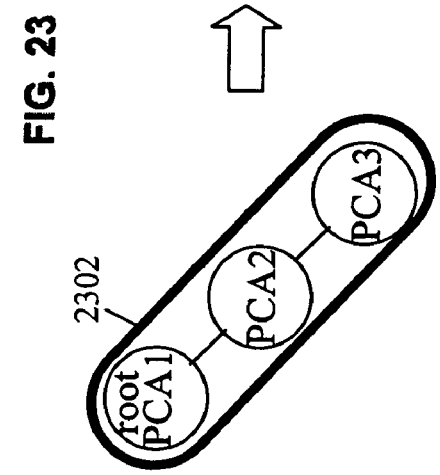
FIG. 22
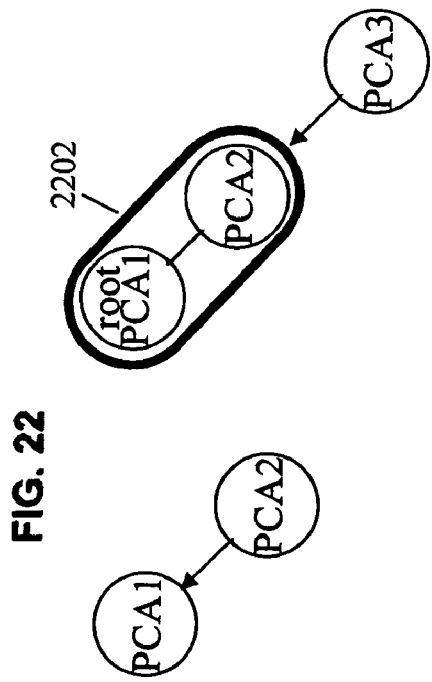
FIG. 23
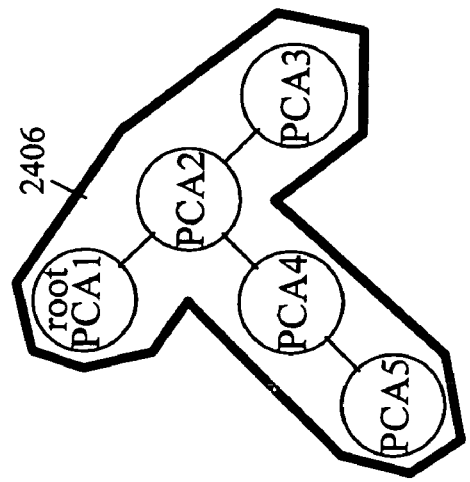
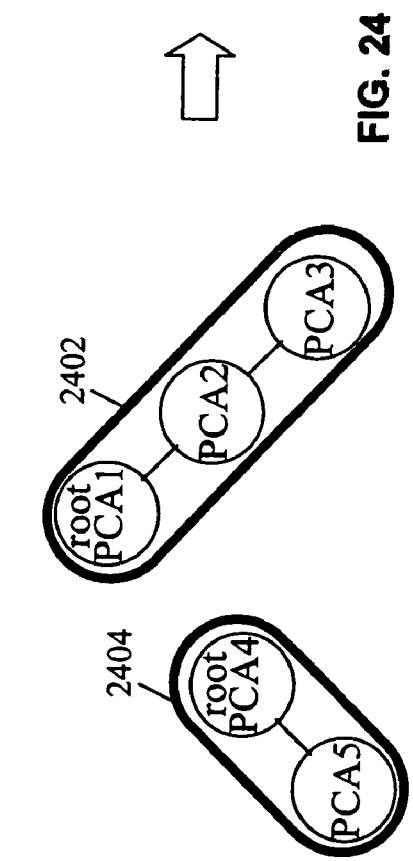
FIG. 24

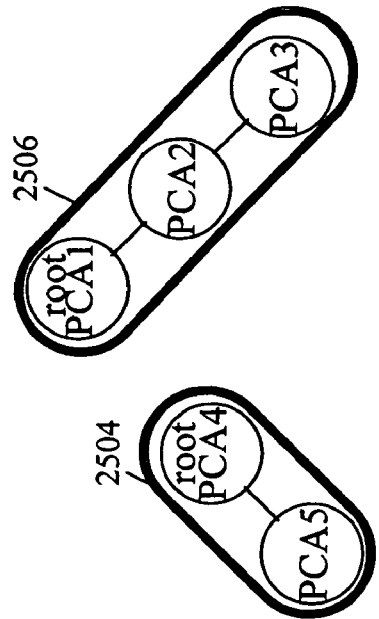
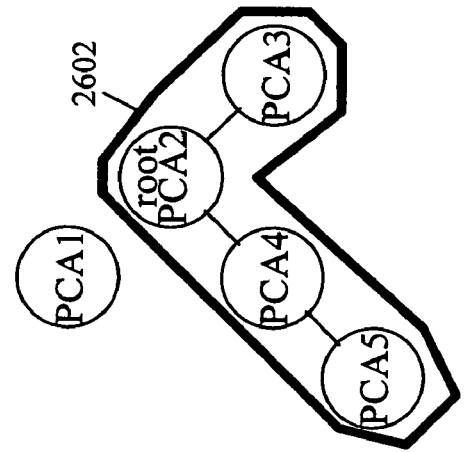
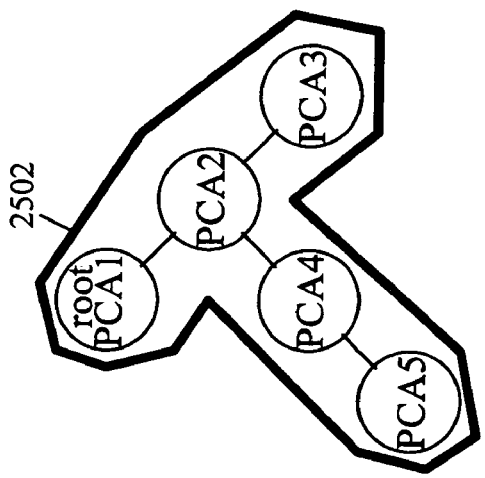
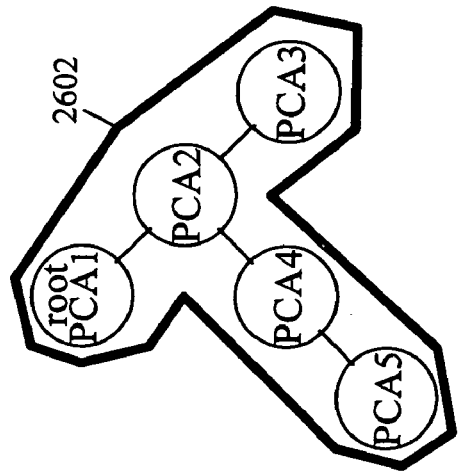
FIG. 25
FIG. 26

METHOD AND ASSOCIATED APPARATUS FOR DISTRIBUTED DYNAMIC PAGING AREA CLUSTERING UNDER HETEROGENEOUS ACCESS NETWORKS

The present application is a Divisional of application Ser. No. 10/185,240, filed Jun. 28, 2002, entitled "Method and Associated Apparatus for Distributed Dynamic Paging Area Clustering Under Heterogeneous Access Networks," assigned to the corporate assignee of the present invention and incorporated here by reference.

RELATED APPLICATIONS

This application claims priority of U.S. provisional patent application Ser. No. 60/327,097, filed Oct. 4, 2001 in the name of Daichi Funato, which is incorporated herein by reference.

BACKGROUND

The present invention relates generally to radio communication systems. More particularly, the present invention relates to a method and associated apparatus for distributed dynamic paging area clustering under heterogeneous access networks.

As wireless technology and the Internet are commercially developed, mobile Internet access becomes more and more popular globally. In the developing third generation and fourth generation (3G and 4G, respectively) wireless system, wireless and Internet technology will be combined together. In such systems, a mobile host is free to move about a region while remaining in radio contact with a base station or other fixed infrastructure access point. Each base station of a network serves mobile hosts in a geographic area surrounding the base station. As the mobile host moves, communication with the mobile host is handed off from one base station to another. Research and standardization efforts are currently underway with a goal to integrate both cellular technologies and Internet technologies. Paging technology is one such technology.

Paging technology partitions all cells in a cellular system into several different areas called paging areas. A mobile host travelling across these paging areas is required to register a new location whenever it moves from one paging area to a different one. When the mobile host is within a paging area, its exact location is unknown to the system. As a result, when a call arrives, the exact location of the called MH is determined by sending paging message to all cells of the MH's paging area. Paging technology has proven to be very effective to reduce the power consumption at the mobile host.

Paging technology is used to track a mobile host (MH) that is in a dormant mode. The mobile host enters the dormant mode when not actively communicating in order to conserve battery power. While in the dormant mode, however, a MH is capable of receiving a signal from a nearby access point, reporting to it an area identifier (ID) indicating the paging area where the MH is traveling. The paging area is the portion of a network or system to which a paging signal intended for a particular MH is broadcast. While traveling from one paging area to another, the MH can recognize if and when it crosses the boundary between paging areas and enters another paging area because it begins receiving a different area ID signal upon crossing the boundary. The MH, upon reception of the different area ID signal, wakes up from the dormant mode to an active mode and sends a signal to register itself with the new paging area.

In 3G and 4G wireless systems, the backbone is assumed to be an Internet Protocol (IP) network. IP is a standardized communication format applicable to both wireless and wireline communication systems, or a combination of the two. An IP based paging protocol is necessary for 3G and 4G wireless systems.

A challenge in the development of IP paging technology is how to assign paging areas. Two issues have been identified with defining and arranging or configuring paging areas. The first issue is on the size of a paging area. If each paging area is sized to be relatively large, significant network resources must be diverted to paging operations conducted in that area. A paging signal must be broadcast extensively to cover the large area to locate just one MH. If each paging area is defined to be relatively small, a significant amount of energy will be used in the MH for responding to paging signals. If paging areas are defined to be relatively small, the MH will frequently cross a boundary between two adjacent paging areas. Each time the MH crosses a boundary, it has to wake up and register with a new area, dissipating battery power.

The other issue in sizing paging areas is overlapping of paging areas. In current communications systems, each paging area is allowed to have a limited number of area IDs (usually one area ID). Some arrangements are needed to dynamically define and arrange paging areas under this constraint on the number of area IDs that each paging area is allowed to have.

Much existing research has been done on how to construct an appropriate paging area. In one reference, it is proposed to use an individual location area concept that treats mobile user with different mobility and call characteristics differently to reduce the average signaling cost of mobility management. Based on this concept, several approaches such as a time-based strategy and profile-based strategy have been introduced for the cellular paging systems. However, all this research has been directed to design a static paging area which means the paging area construction will be fixed all the time. However, simulation results show that such fixed paging area design will lead to a high paging cost under many circumstances. This is because the user traffic varies from time to time; a static paging area may not be able to cover the traffic pattern well so that the location update cost increases significantly.

Current paging technology uses fixed paging areas. Paging areas are manually defined and arranged, and once defined and arranged, they are seldom changed. These manually defined paging areas are thus inflexible and cannot adapt themselves to changes in communication traffic. Also, since paging areas are defined manually, human errors are unavoidable. Some proposals have been made on dynamic configuration of paging areas, but these proposals permit unlimited overlapping of area IDs. In these proposals, each MH dynamically computes and shapes its optimal paging area size according to the traffic and movements. Naturally, each paging area overlaps in those individual paging schemes.

Much research has been done to optimize paging area configuration so that the overall paging cost can be minimized. The total paging cost for the system comes from two parts, location update cost and paging cost. The location update cost is the resource used to update the user location when the user moves into a new paging area. The paging cost is the resource used to send messages to the user within each paging area. A properly designed paging area should be able to minimize the overall paging cost.

A dynamic paging area construction algorithm has been proposed. For example, a dynamic method for configuring sizes and shapes of paging areas, along with an individual location, has been proposed. However, it is difficult to control location area overlap in the proposed method. Paging area overlap has to be controlled in most cellular system such as the Personal Digital Cellular (PDC) system in Japan, the Global System for Mobile communication (GSM) and wideband code division multiple access (W-CDMA) systems. These wireless systems are designed to broadcast a restricted number of paging area IDs per base station at a time. As a result, a base station can not belong to many location areas simultaneously.

Accordingly, there is a need for an improved paging area construction method and apparatus.

BRIEF SUMMARY

By way of introduction only, in accordance with the presently disclosed embodiments, paging areas may be automatically reconfigured as required. Paging areas can be adaptively reconfigured in accordance with changes in movement traffic of mobile hosts. The system and method in accordance with these embodiments work under a constraint that only a limited number of area IDs are permitted for each paging unit area. Also, the system and method work over heterogeneous access networks. Thus, according to the presently disclosed embodiments, paging areas reconfigure themselves according to changes in movement traffic of MHs.

The foregoing summary has been provided only by way of introduction. Nothing in this section should be taken as a limitation on the following claims, which define the scope of the invention.

BRIEF DESCRIPTION OF THE DRAWINGS

FIGS. 11 and 12 illustrate organization of one embodiment of the probability map of the paging area clustering agent of FIG. 9;

FIG. 14 shows one embodiment of the format of default information in the exemplary cluster map of FIG. 13;

FIG. 15 shows one embodiment of the format of branch information in the exemplary cluster map of FIG. 13;

FIG. 16 shows one embodiment of the format of root information in the exemplary cluster map of FIG. 13;

FIG. 20 is an operational block diagram of the host reporter agent in the mobile host of FIG. 9;

FIGS. 22-26 illustrate clustering operations; and

DETAILED DESCRIPTION OF THE PRESENTLY PREFERRED EMBODIMENTS

In systems that use paging, mobile hosts operate in one of two modes, active and dormant mode. When actively transmitting or receiving data, the mobile terminal is in an active state. In this state, the network knows has location information for the mobile host and is ready to deliver data immediately. If the mobile host is inactive for a period of time, it will change into a dormant mode. In dormant mode, the network's location information for the mobile host may be stale. If data arrives in the network for the mobile host, the mobile host must first be located before data can be delivered. This procedure of locating the mobile host is broadly referred as paging.

Paging is beneficial for a mobile host because it reduces the amount of time the mobile host is required to listen to the radio interface, which drains the mobile host's battery. Furthermore, paging reduces network signaling costs by requiring the mobile host to signal only when it crosses a paging area boundary rather than when it switches between base stations. The large amount of signaling for mobile terminal tracking is reduced when paging areas contain many base stations.

Figure 1:
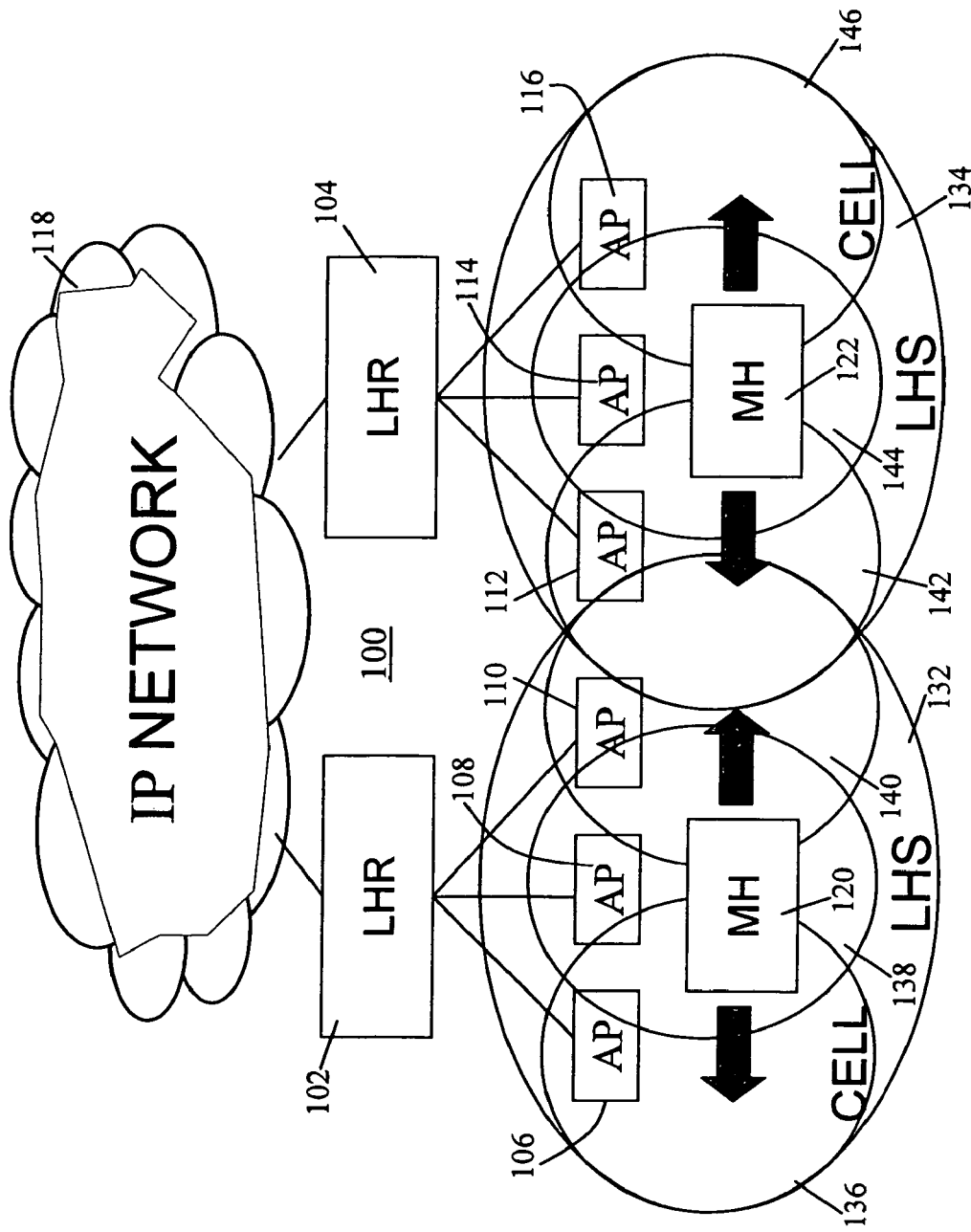
FIGS. 1-6 are block diagrams of various embodiments of a radio communication network.

Referring now to the drawing, FIG. 1 is a block diagram of one embodiment of a radio communication network 100. The network 100 includes a first last hop router (LHR) 102, a second LHR 104, a plurality of access points (AP) 106, 108, 110 associated with the first LHR 102 and a plurality of access points 112, 114, 116 associated with the second LHR 104. A first mobile host (MH) 120 is in communication with the first plurality of access points 106, 108, 110 and a second mobile host 122 is in communication with the second plurality of access points 112, 114, 116. As used herein, communication may be wireline or wireless communication. One example of wireline communication is digital communication according to TCP/IP. One example of wireless communication is IP communication on a W-CDMA network.

The last hop routers 102, 104 are in communication with an internet protocol (IP) network 118, which may be the Internet or a subnetwork. The last hop router is the edge router to which a mobile host may be connected. A last hop router serves a last hop subnet (LHS). A last hop subnet is the edge subnet to which a mobile host is directly connected. Thus, LHR 102 serves LHS 132 and LHR 104 serves LHS 134.

Access points 106, 108, 110, 112, 114, 116 are equipment that provides paging and access through a layer 2 connection to a mobile host within a cell served by each respective access point. Examples of access points are base stations in a cellular or personal communication system (PCS) network. Thus, access point 106 serves a cell 136; access point 108 serves a cell 138; access point 110 serves a cell 140; access point 112 serves a cell 142; access point 114 serves a cell 144; and access point 116 serves a cell 146.

A mobile host (MH) such as mobile hosts 120, 122 is a standard IP host, able to communicate with remote devices using internet protocol. Typically, a MH is battery powered so as to be mobile or portable. A MH further includes the ability to enter a dormant mode which is a low-power mode. The dormant mode is a state in which the MH restricts its ability to receive normal IP traffic by reducing its monitoring of radio channels. This allows the MH to save battery power and reduces signaling load on the network. Actual two way communication requires exiting the dormant mode and return to an active mode.

The communication network 100 is configured to provide paging for mobile hosts in the network. Paging is signaling by the communication network 100 through radio access points directed to locating a dormant mode MH and alerting it to establish a last hop connection. In a last hop connection, the MH is in two-way communication with an AP. A paging area is a collection of radio access points that are actuated to locate a dormant MH. A dormant mode MH may be required to signal to the network when it crosses a paging area boundary so that the network can maintain an approximate location for the MH. A paging area cluster is a collection of paging areas which share a common paging area identifier.

A typical IP paging protocol operates as follows:

A. Registration

When a mobile host enters dormant mode or when it moves out of its current paging area, it registers with a tracking agent (TA) of a base station. A tracking agent is responsible for tracking a mobile host's location while it is in dormant mode or active mode, and for determining when the mobile host enters active mode. Registration specifies the mobile host's identity (home address for example) and the identifier of its current paging area. Upon reception of a paging registration, the TA creates an entry that binds the host's identity with the paging agent (PA) that is in charge of the paging area specified in the registration. A paging agent is responsible for alerting the mobile host when a packet arrives and the host is in dormant mode. It also sends a report to a dormant monitoring agent (DMA) when the host has entered dormant mode. The dormant monitoring agent detects the delivery of packets to a host that is in dormant mode.

B. Packet Delivery

During the dormant period, if data arrives in the network for the mobile host, the host must first be located before data can be delivered. When the DMA receives packets for the host, it buffers them, since the host is registered as dormant. The DMA then asks the TA for the host's current PA. The TA in turn asks the PA to page the mobile host. The PA sends a paging request to all base stations in the network which belong to the PA. Finally, each base station broadcasts a radio transmission containing the page on a downlink to the dormant mobile host. When the mobile host wakes up from the dormant mode to the active mode, it sends a response message in the on the uplink to the paging base station. The mobile host enters the active state and registers its current location. For example, the mobile host provides a care-of address to the DMA. The DMA then forwards the packets to the registered mobile host.

C. Dynamic Paging Area Configuration

Proper design of paging areas is based on a tradeoff between paging traffic and location update traffic. As the size of the paging area increases, the paging cost increases and the location update cost decreases. On the other hand, as the size of the paging area decreases, the paging cost decreases and the location update cost increases. In general, paging traffic is proportional to the number of calls to base stations in the paging area, while location update traffic is proportional to the number of mobile hosts crossing paging area borders.

A dynamic paging area configuration algorithm must minimize the overall network location updating and paging cost. Generally, paging traffic is less critical than location update traffic since a location update affects not only the radio resource, but the load of distributed location databases in TA as well.

In the description herein, it is assumed that beacon frames are transmitted periodically or continuously from each base station or base station router to allow mobile hosts to identify current location information. The beacon frame must contain at least a Paging Area ID (PA-ID) and a Base Station ID (BS-ID).

A PA-ID indicates the current paging area. The PA-ID may change when the base station changes its paging area. A BS-ID uniquely identifies a base station. The BS-ID is fixed. It is assumed the PA-ID and BS-ID are the same at the time of system initialization.

It is further assumed that a mobile host is able to listen to beacons from base stations even if it is in its dormant mode. Furthermore, it is assumed that the mobile host is able to identify the BS-ID of the cell in which the mobile host currently located and save this information for the later use.

It is further assumed that each base station router has capabilities of a paging agent (PA) and a dormant monitoring agent (DMA). It is also assumed that the PA-ID and the BS-ID can be mapped to the layer-3 address (IP address) of base station routers using layer-2 to layer-3 mapping protocols such as Inter Access Point Protocol. That means an IP address of a BSR can be obtained from the beacon information.

The network communication protocol defines a message for movement traffic sampling. A mobile host listens to beacons and can store the latest beacon information. This stored data is used for pollination to a next base station. When a mobile host moves to another paging area, it wakes up from the dormant mode to the active mode and updates its location information to the TA and DMA through a transmission to a base station. At that time, the mobile host contains the memory of the previous beacons even if it was not registered to that base station. A message is defined to send the information to the new base station. The notification message contains the PA-ID and BS-ID of the previous base station so that the new base station recognizes the origin of the mobile host.

FIGS. 1, 2, 3, 4 and 5 show one example of a network with an exemplary paging area. In FIG. 1, each LHR 102, 104, creates a last hop subnet in which three access points are deployed. Each respective AP defines a respective cell.

Figure 3:
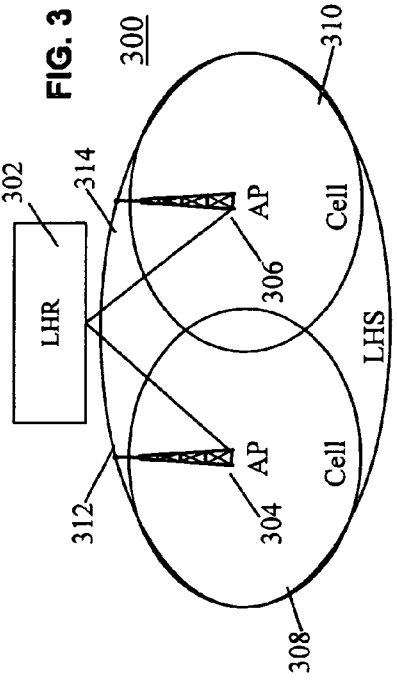
Figure 2:
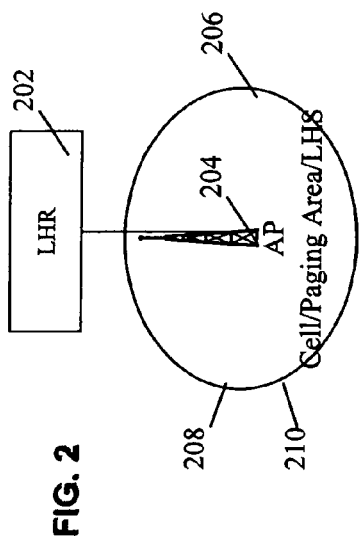

FIGS. 2-5 illustrate additional examples of networks with additional exemplary paging areas. In FIG. 2, a network 200 includes a single LHR 202 and one AP 204. A cell 206 is served by the AP 204. The LHR 202 defines one LHS 208 and one paging area 210 coextensive with the LHS 208. In FIG. 3, a network 300 includes one LHR 302 and two APs 304, 306. The AP 304 serves a cell 308 and the AP 306 serves a cell 310. The LHR 302 and APs 304, 306 together define one LHS 312 and a coextensive paging area 314.

Figure 4:
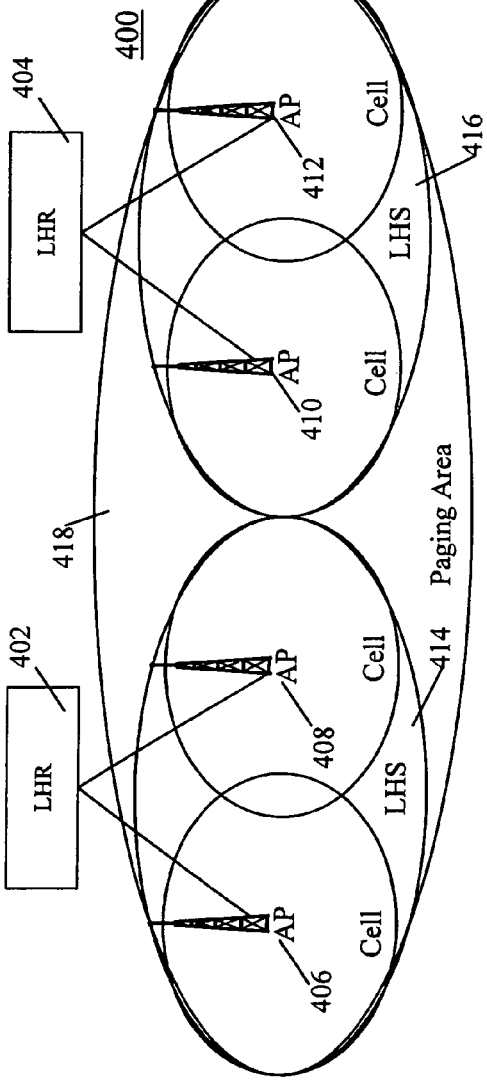

In FIG. 4, a network 400 includes two LHRs 402, 404. The LHR 402 has two associated APs 406, 408. Each of the APs 406, 408 serves an associated cell. Similarly, the LHR 404 has two associated APs 410, 412. Each of the APs 410, 412 serves an associated cell. The APs 406, 408 together create an LHS 414. The APs 410, 412 together create an LHS 416. All four APs 406, 408, 410, 412 together create one paging area 418.

Figure 5:
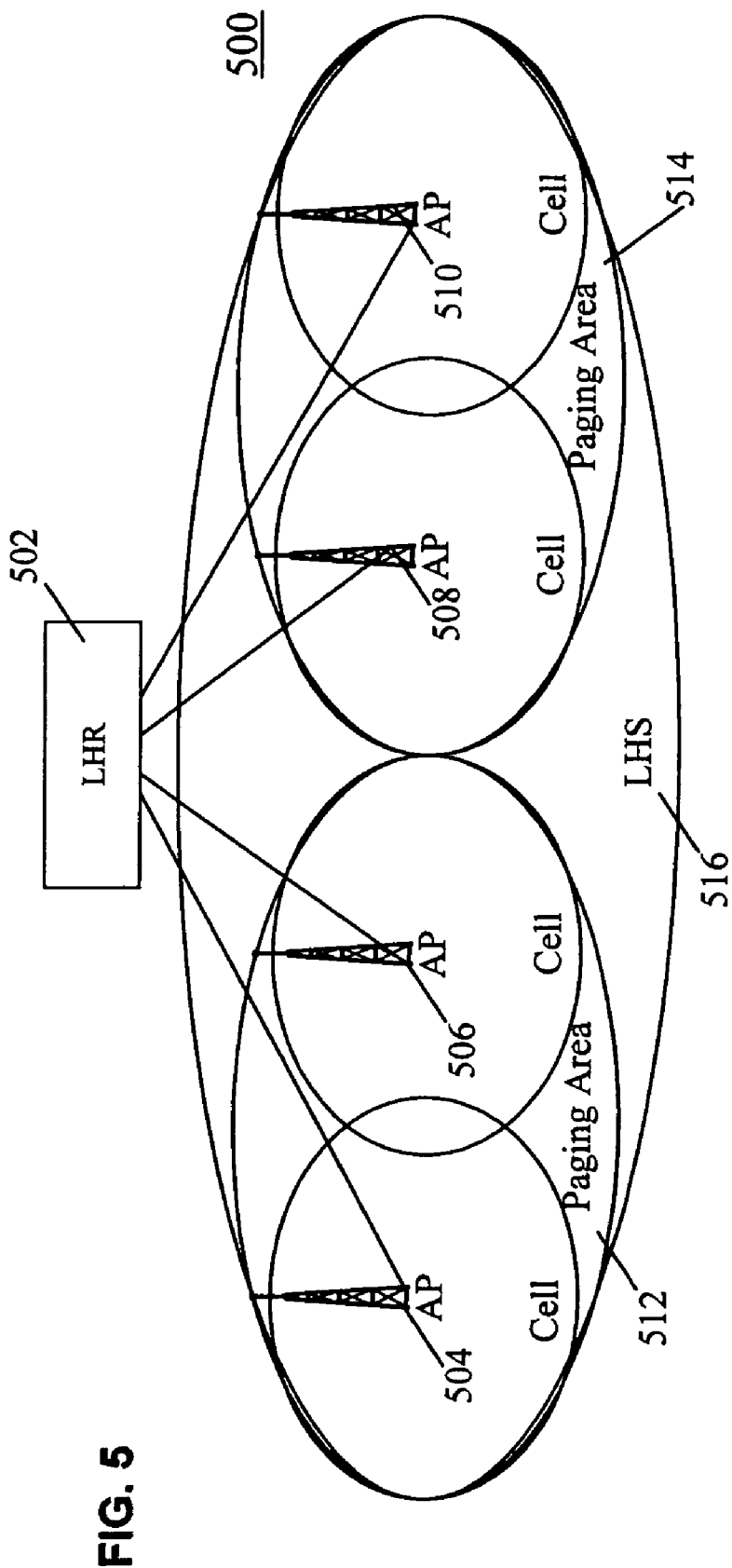

In the network 500 of FIG. 5, a LHR 502 has four associated APs 504, 506, 508, 510. Each AP serves a respective cell. Each pair of APs creates a paging area. Thus, the pair of APs 504, 506 creates a paging area 512 and the pair of APS 508, 510 creates a paging area 514. The paging areas 512, 514 together form a LHS 516.

Figure 6:
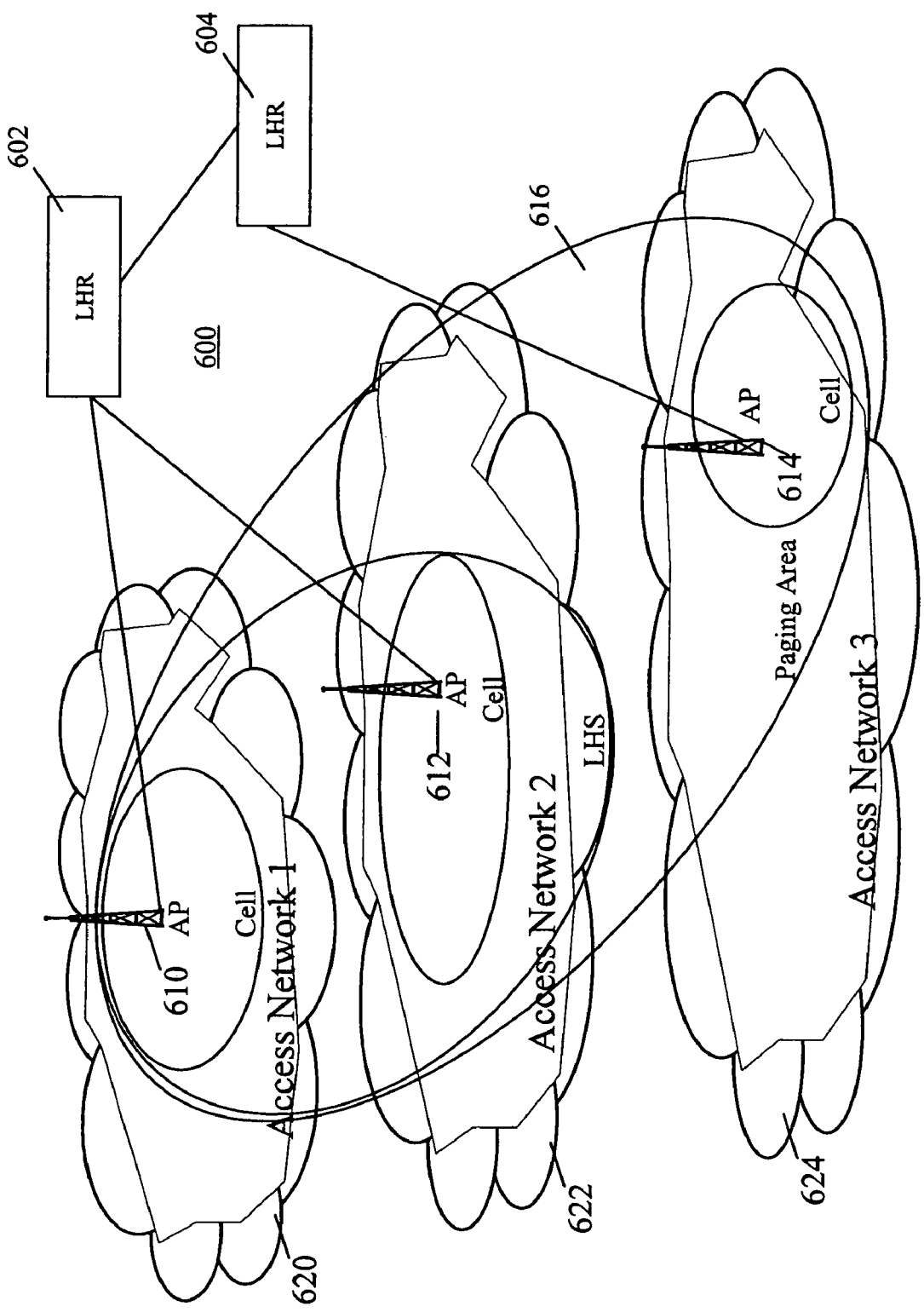

In the network 600 of FIG. 6, two LHRs 602, 604, in conjunction with three access points 610, 612, 614, define a paging area 616. The AP 610 is associated with a first access network 620. The AP 612 is associated with a second access network 622. The AP 614 is associated with a third access network 624. Each AP 610, 612, 614 services an associated cell, providing radio communication to mobile hosts within the associated cell. The paging area 616 extends over portions of each of the access networks 620, 622, 624.

Thus, paging areas may be arranged in any of a wide variety of configurations. Paging areas may exist within and among last hop subnetworks and within and among access networks. In accordance with the embodiments disclosed herein, paging areas may be dynamically reconfigured as required by system circumstances.

Figure 7:
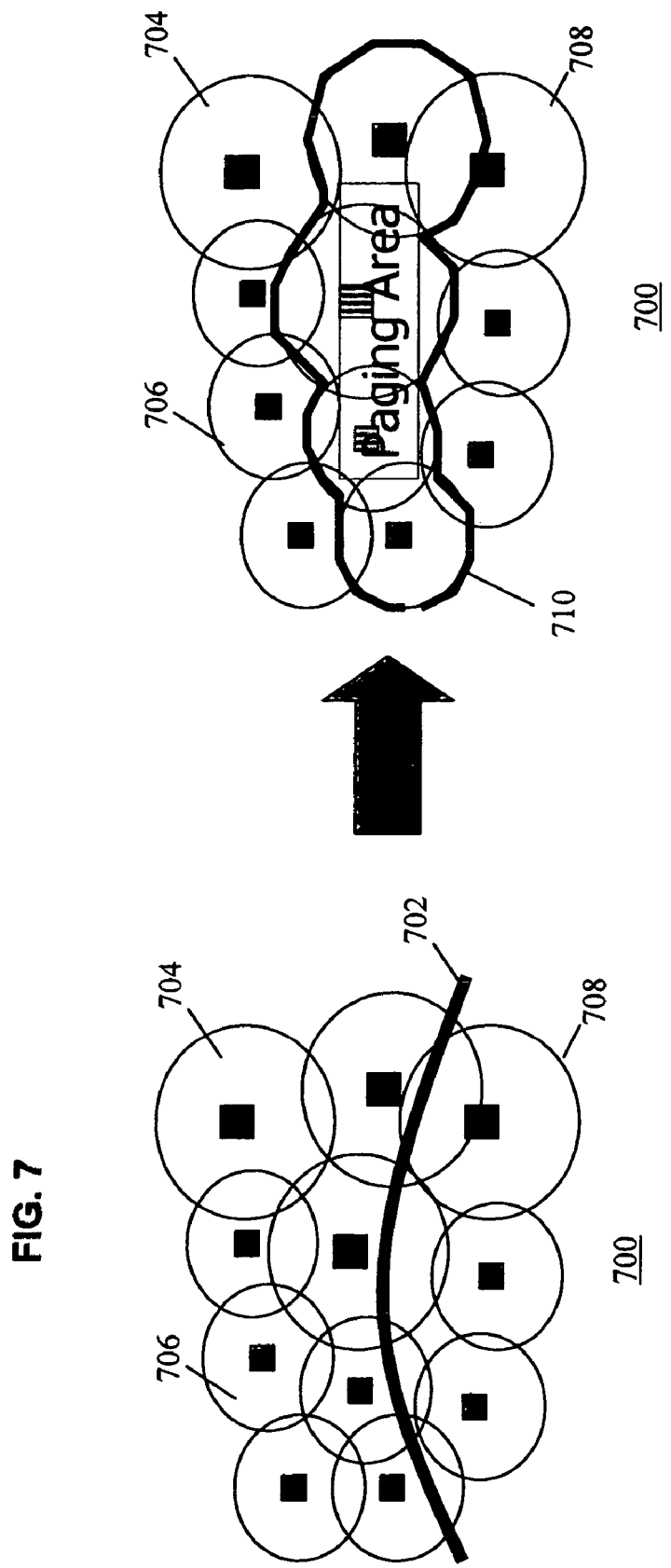
FIGS. 7 and 8 are block diagrams illustrating reconfiguration of paging areas in a radio communication system.

FIG. 7 is a block diagram illustrating reconfiguration of paging areas in a radio communication system. FIG. 7 shows a portion of a cellular radio communication network 700 positioned near a road 702. The network 700 includes a plurality of access points serving cells such as cells 704, 706, 708. Initially, each cell corresponds to a minimum paging area. Minimum paging areas are defined by circles with respect to the road 702 as shown in the left drawing of FIG. 7. As radio traffic in the network 700 increases along with vehicle traffic along the road 702, paging areas located along the road will be joined to define one large paging area 710 as shown in the right drawing of FIG. 7. Subsequently, as traffic permits, paging areas may be ungrouped even to the point of minimum paging areas such as in the left drawing of FIG. 7.

Preferably, paging areas are auto configured to minimize human effort and error. Paging areas are preferably well adapted to user movements to enhance paging efficiency in the network. Further, the method which produces this paging area clustering preferably provides a limited overlapping permission mechanism. Still further, the method of paging area clustering should be applicable across many heterogeneous access networks.

Figure 8:
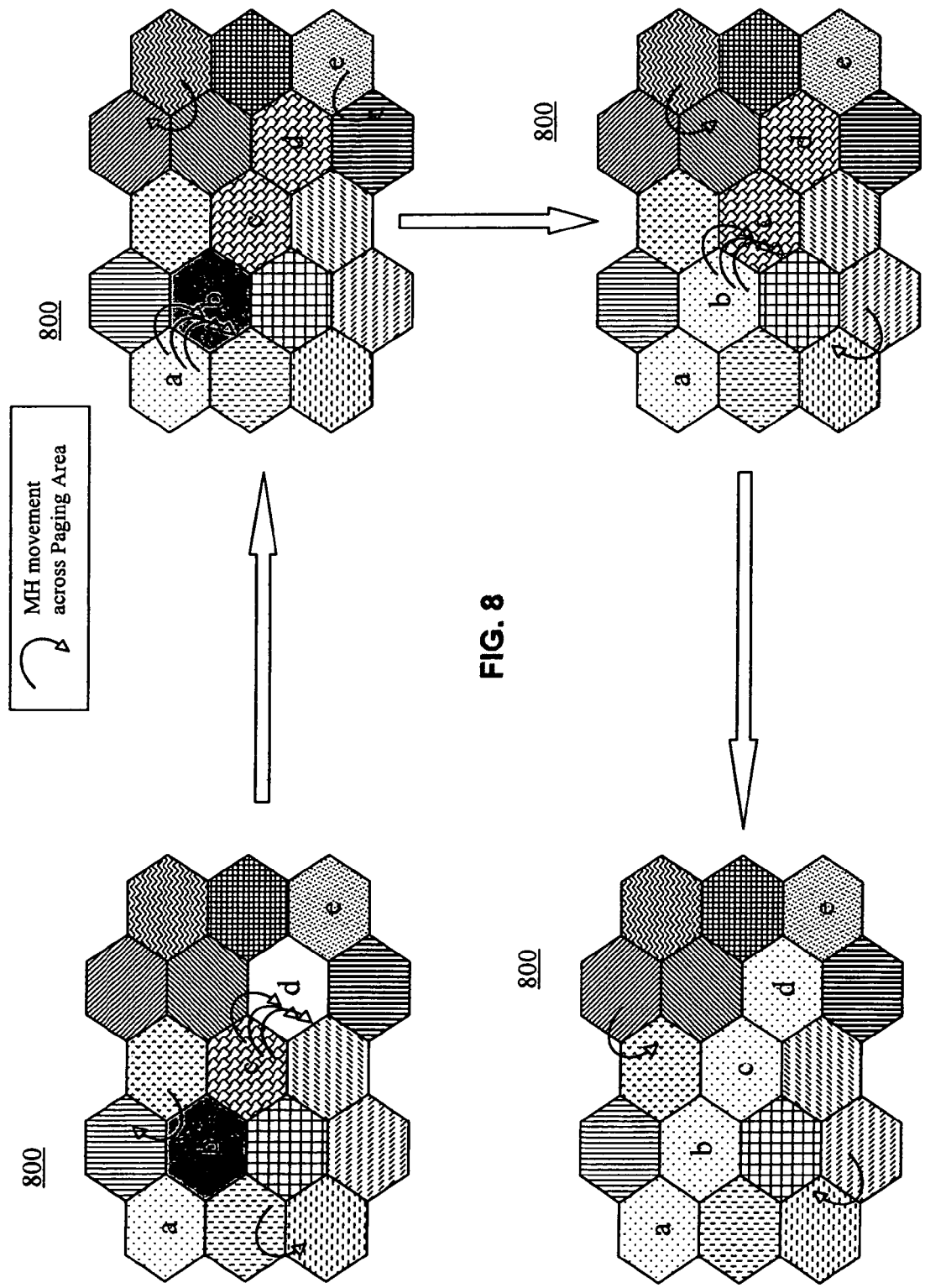

FIG. 8 is a series of block diagrams illustrating another example of paging area clustering. FIG. 8 shows time variation in paging areas in a radio communication system 800. In the drawings of FIG. 8, each hexagon shows a minimum paging area. Combined or clustered paging areas have common fill patterns. Starting from the upper left drawing of FIG. 8, movement traffic of mobile hosts (MHs) from area c to area d increases. Movement of traffic of MHs is represented by the arrows within each individual drawings of FIG. 8. This depiction is a simplification of traffic in an actual system. As a result of this traffic movement, area d adopts area c's area ID, and areas c and d become one paging area, as is shown by the changed fill of area d in the upper right drawing of FIG. 8.

Subsequently, as shown in the upper right drawing, MH traffic increases from area a to area b. As a result, area b adopts area a's area ID, and areas a and b become one paging area, as shown by the changed fill of area b. Subsequently, as shown in the lower right drawing of FIG. 8, MH traffic increases from area b to area c. As a result, as shown in the lower left drawing, areas c and d adopt area b's area ID, and areas a, b, c and d become one large paging area. Thus, in this exemplary embodiment, paging areas reconfigure themselves according to changes in movement traffic of MHs.

Figure 9:
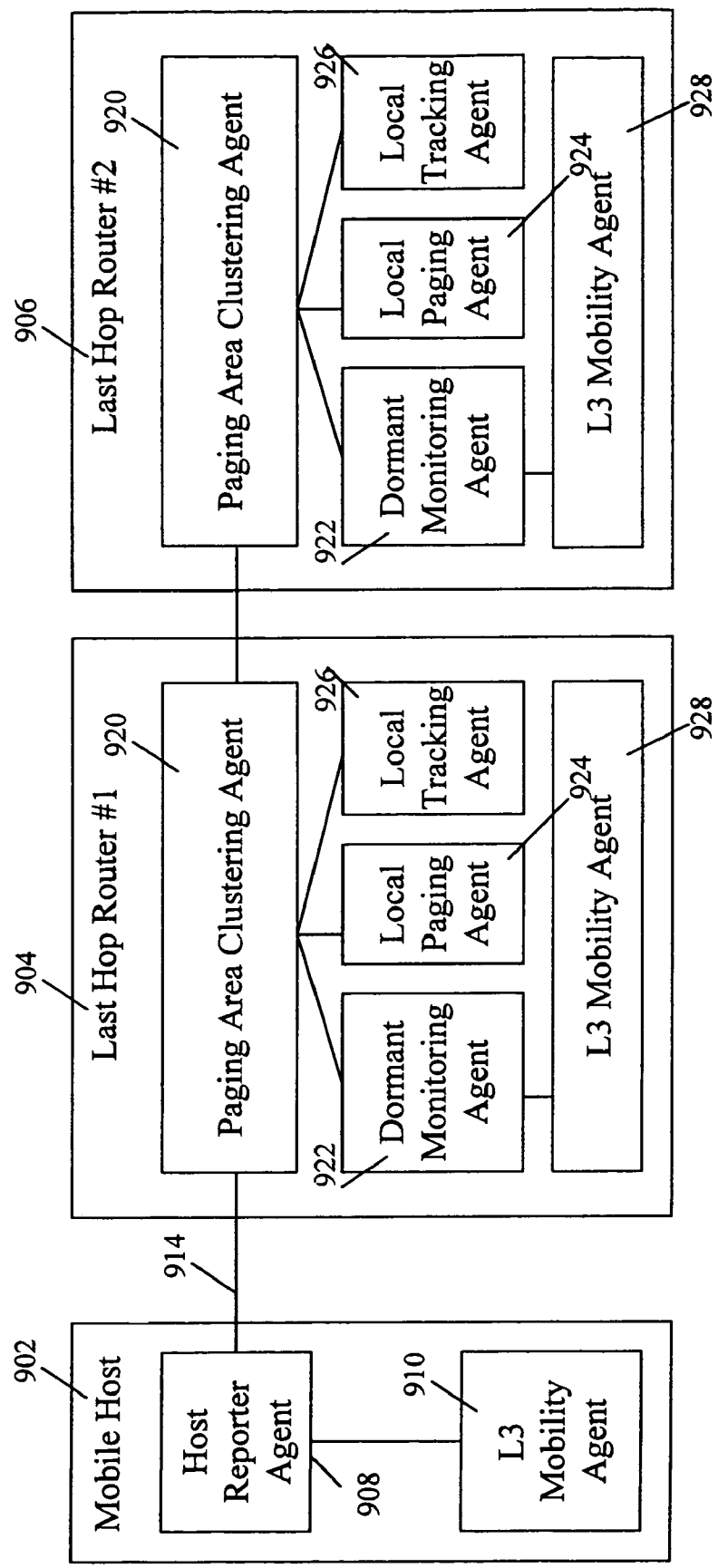
FIG. 9 is a block diagram showing exemplary embodiments of a mobile host and two last hop routers.

FIG. 9 is a block diagram showing exemplary embodiments of a mobile host 902 and two last hop routers 904, 906. Each of these devices and its components will be describe below.

The mobile host (MH) 902 may be embodied, for example, as a cellular or PCS telephone, a personal digital assistant (PDA), a personal computer, or combinations of these or any other electronic devices. The mobile host 902 includes a host reporter agent 908 and a layer 3 mobility agent 910. In a typical embodiment, the mobile host 902 is embodied as a mobile or portable electronic device including a battery, a processor, memory, a user interface and radio circuit. These components are not shown in FIG. 9 so as not to unduly complicate the drawing. The battery provides operating power for the MH 902. The processor may by a microprocessor, microcontroller digital signal processor or other logic device or combination of devices which controls operation of the mobile host 902. The processor operates in response to program instructions stored in the memory, which may be semiconductor memory such as flash, EPROM or RAM. The user interface permits control of the mobile host 902 by a user and may include a display, a keypad, a speaker and a microphone or other components. The radio circuit permits radio communication with a remote device such as the last hop router 904. The radio circuit in a typical embodiment includes a transmitter and a receiver which encodes and decodes, modulate and demodulate radio signals, respectively. By means of the radio circuit, the mobile host 902 communicates over a radio link 914 with the last hop router 904.

The host reporter agent 908 and the layer 3 mobility agent 910 are implemented as software processes controlling operation and communication in the mobile host 902. The host reporter agent 908 is responsible for reporting movement of the MH 902 to a paging area clustering agent of a last hop router such as LHR 904, 906. The layer 3 mobility agent 910 informs a dormant monitoring agent of a LHR of the arrival of an IP packet. The host reporter agent 908 and the layer 3 mobility agent 910 will be described in greater detail below.

The last hop routers 904, 906 of the exemplary embodiment of FIG. 9 include a paging area clustering agent 920, a dormant monitoring agent 922, a local paging agent 924, a local tracking agent 926 and a layer 3 mobility agent 928. In a typical embodiment, the last hop router 904, 906 provides a radio or wireline link to mobile hosts such as MH 902. The link may include a wireline link to an access point such as a cellular base station which is in radio communication with one or more MHs. The last hop router 904, 906 further provides a wireline link to other network devices such as other routers. Communication with the last hop router 904, 906 is preferably according to internet protocol (IP) but may be in accordance with any suitable data communication protocol or standard.

In an exemplary embodiment, the last hop router 904, 906 includes a processor, a memory and communication circuits. The processor may be a microprocessor or other digital logic for controlling the operation of the last hop router 904, 906, but may be any suitable control circuit. The processor operates in conjunction with program instructions and data stored in the memory. Communication circuits provide communication of data and instructions between the last hop router 904, 906 and other network devices. The processor, memory and the communication circuits are not shown in FIG. 9 so as to not unduly complicate the drawing figure.

In FIG. 9, the last hop router 904 and the last hop router 906 are shown as being substantially identical. However, it will be appreciated that these components may vary widely in their structure and operation depending on their operational requirements.

The paging area clustering agent (PCA) 920 operates to receive movement reports from mobility reporter agents of mobile hosts in communication with last hop router 904, 906. A PCA is notified by a dormant monitoring agent (DMA) of a packet arrival to a mobile host and sends paging clustering messages to the local paging agent (LPA) clusters. Once the PCA 920 receives positive or negative results from LPA clusters, the PCA notifies the DMA. Structure and operation of the PCA 920 will be described in greater detail below in conjunction with FIG. 10.

The dormant monitoring agent (DMA) 922 operates to detect the delivery of packets to a MH such as the MH 902 that is in dormant mode and to inform the PCA 920 to page the MH. Dormant mode is a low power sleep mode which may be entered by the MH to conserve battery power in the MH. Once the PCA 920 has reported that a routable connection to a network such as the Internet exists to the MH, the DMA 922 arranges for delivery of the packet to the MH. In addition, the MH may change a DMA as the MH changes paging area.

The local paging agent 924 (LPA) is responsible for alerting a mobile host such as the MH 902. Additionally, the LPA 924 maintains paging areas by periodically wide casting information over the link to the mobile host to identify the paging area. In this exemplary embodiment, each paging area can be served by multiple Laps.

The local tracking agent (LTA) 926 is responsible for tracking the location of a MH while it is in a same last hop subnet (LHS) when the MH is in either dormant mode or active mode. The layer 3 mobility agent 928 can be a Mobile IP Home Agent or Foreign Agent as those terms are conventionally known. The layer 3 mobility agent 928 informs the DMA 922 of the arrival of an IP packet.

The PCA 920, DMA 922, LPA 924, LTA 926 and layer 3 mobility agent 928 are preferably software processes implemented on the last hop router 904, 906. Suitable program code and data for performing these software processes may be stored in memory of the last hop router 904, 906 for operation of a processor or other control circuit of the last hop router 904, 906.

Figure 10:
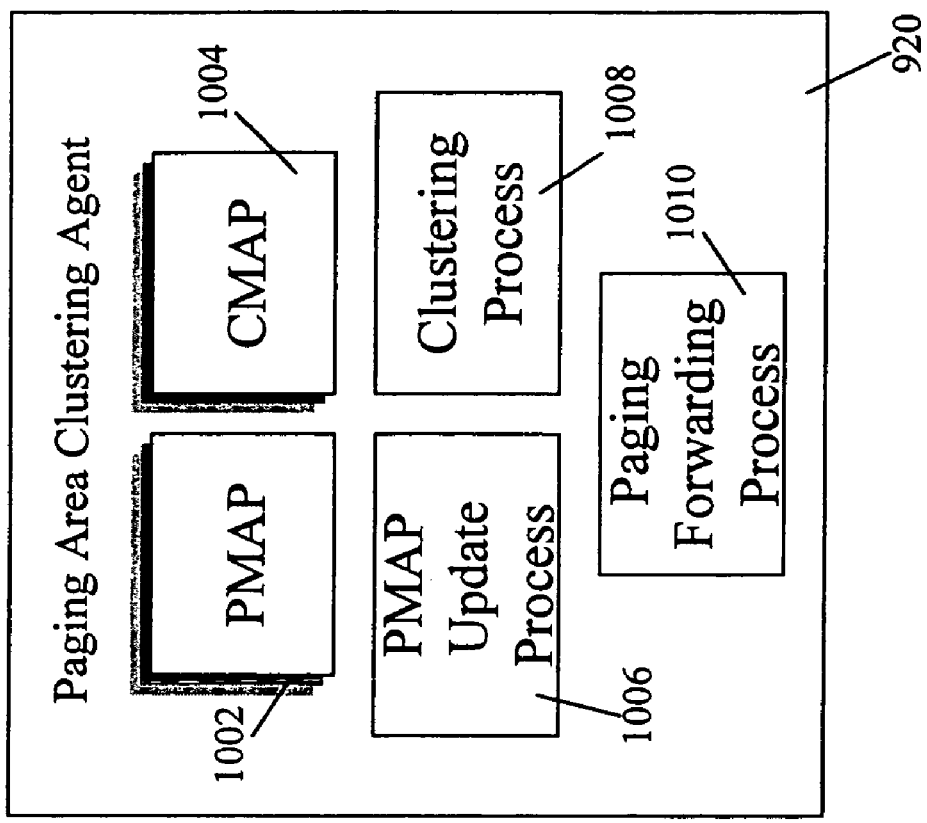
FIG. 10 is an operational block diagram of the paging clustering agent of FIG. 9.

FIG. 10 is an operational block diagram of the paging area clustering agent 920 of FIG. 9. The paging area clustering agent 920 in the exemplary embodiment includes a probability map (PMAP) 1002, a cluster map 1004, a probability map update process 1006, a clustering process 1008 and a paging forwarding process. These components of the paging area clustering agent 920 are preferably embodied as software processes for controlling a last hop router such as the LHR 904, 906 of FIG. 9.

The paging area clustering agent 920 maintains a probability map 1002 to decide which paging group the PCA 920 should join. The PCA 920 uses a cluster map to maintain the relation to other paging area clustering agents. The probability map update process (PUP) 1006 operates to maintain the probability map 1002. The clustering process 1008 performs the core functions of the paging area clustering agent 920. The paging forwarding process (PFP) executes forward paging requests. Each of these processes will be described in greater detail below.

Figure 11:
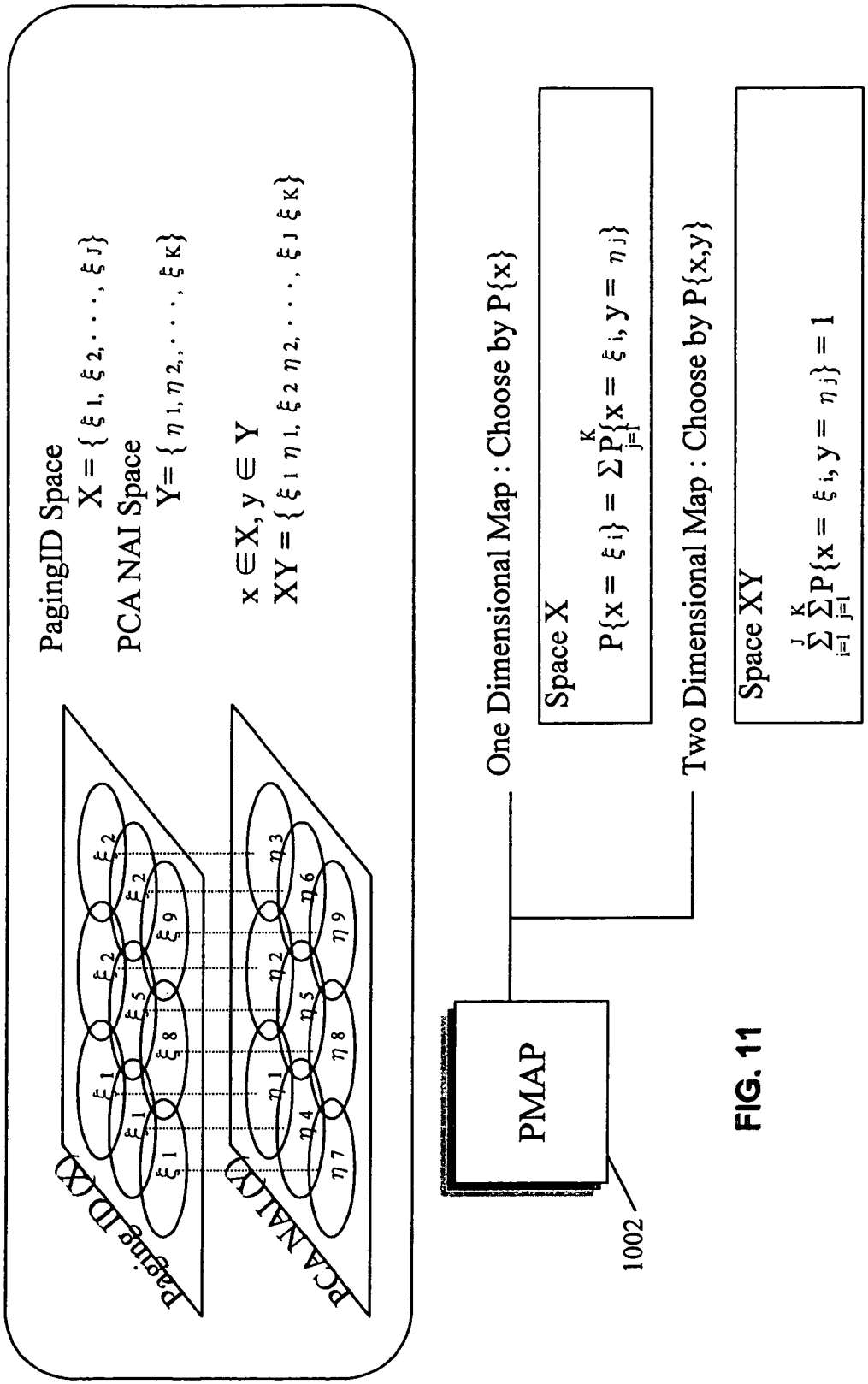

FIGS. 11 and 12 illustrate organization of one embodiment of the probability map 1002 of the paging area clustering agent 920 of FIG. 9. The PMAP 1002 includes a statistical record of past movement traffic of MHs. In the PMAP 1002, each minimum paging area or paging unit area is defined with two spatial variables (X, Y) as shown in FIG. 11.

$$X=\{\xi_1, \xi_2, \ldots \xi_J\},$$

where $\xi_i$ denotes the area ID of paging area i.

$$Y=\{\eta_1, \eta_2, \ldots \xi_K\},$$

where $\eta_i$ denotes the network address identifier (NAI) of paging area i. A NAI may be an IP address.

An example is illustrated in FIG. 12. Assume that in past operation of the network, the probability that MH traffic moved from $(\xi_1, \eta_1)$ to $(\xi_5, \eta_5)$ for a specific time period is 40%. The probability that MH traffic moved from $(\xi_2, \eta_2)$ to $(\xi_5, \eta_5)$ is 30%. The probability that MH traffic moved from $(\xi_2, \eta_6)$ to $(\xi_5, \eta_5)$ is 20%. The probability that MH traffic moved from $(\xi_8, \eta_8)$ to $(\xi_5, \eta_5)$ is 10%. Accordingly, the PMAP 1002 has a table 1202 entitled "two dimensional map" on in FIG. 12. This two dimensional map table is converted into a table 1204 entitled "one dimensional map." In conversion, probabilities of coming from the same paging area IDs ($\xi$) are added. This one dimensional map indicates that area ID ($\xi_5$) should be changed to area ID ($\xi_2$) because, according the past movement traffic statistics, MH traffic came most into that area from area ($\xi_2$). Thus, the PMAP 1002 tells which paging areas should be merged together or which paging areas should be severed from each other.

Figure 13:
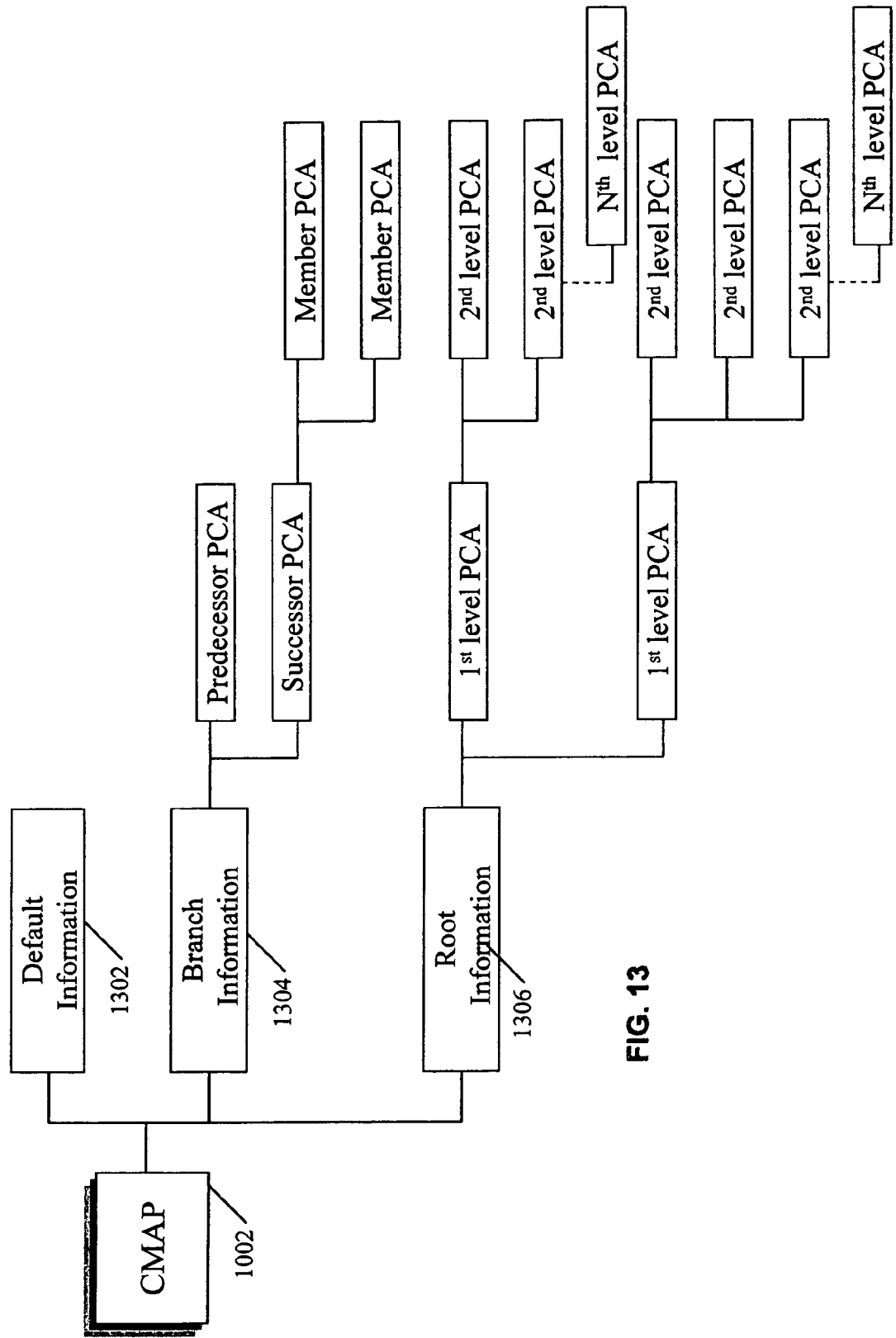
FIG. 13 shows an exemplary cluster map of the paging clustering agent of FIG. 9.

FIG. 13 illustrates organization of the cluster map (CMAP) 1004 of the paging area clustering agent 920 of FIG. 10. The CMAP 1004 maintains information as to which paging area is currently joined to or belongs to which area. As shown in FIG. 13, the cluster map 1004 stores three kinds of information: default information 1302; branch information 1304; and root information 1306. At the outset of operation, paging areas are independent and not joined to any other areas.

FIG. 14 shows one embodiment of the format of the default information 1302. The default information 1302 includes the paging area ID 1402 of such an independent paging area. The default information 1302 further includes the network address identifier (NAI) 1404 for the paging clustering agent (PCA). The NAI is unique to the PCA and includes, for example, its IP address.

FIG. 15 shows one embodiment of the format of the branch information 1304. In this embodiment, the branch information 1304 includes the root paging identifier (PID) 1502 of the cluster group's paging clustering agent, a network address identifier 1504 for a predecessor paging clustering agent, and a list of network access identifiers 1506 for paging cluster agents which may be successors to the current PCA.

FIG. 16 shows one embodiment of the format of the root information 1306. The root information 1306 includes a root paging identifier 1602, which is preferably equal to the default PID for the paging clustering agent. The root information 1306 further includes a complete list 1604 of network address identifiers of possible successor paging area clustering agents. In the list 1604, each nearest possible successor PCA has associated with it a list of adjacent PCA network address identifiers. Thus, the first entry 1606 in the list 1604 of FIG. 16 is a list 1608 of possible successor PCA NAIs. Similarly, the second entry 1610 in the list 1604 includes a list 1612 of possible successor PCA NAIs. In the preferred tree structure, entries of the list 1608 further include associated leaf PCA NAIs such as NAI 1614.

The branch information 1304 and root information 1306 may be explained, using the example of FIG. 8. Paging areas a, b, c and d all have the same ID assigned to area a. Area a is called a root area and has the root information. The root information indicates all of the paging areas that belong to the root area, i.e., areas b, c and d, in a tree structure. Paging areas other than root areas have branch information that indicates an immediately preceding paging area and all of the succeeding paging areas depending from it. Thus, for instance, area b has branch information that indicates that the immediately preceding area is a, and the succeeding areas are c and d.

Figure 17:
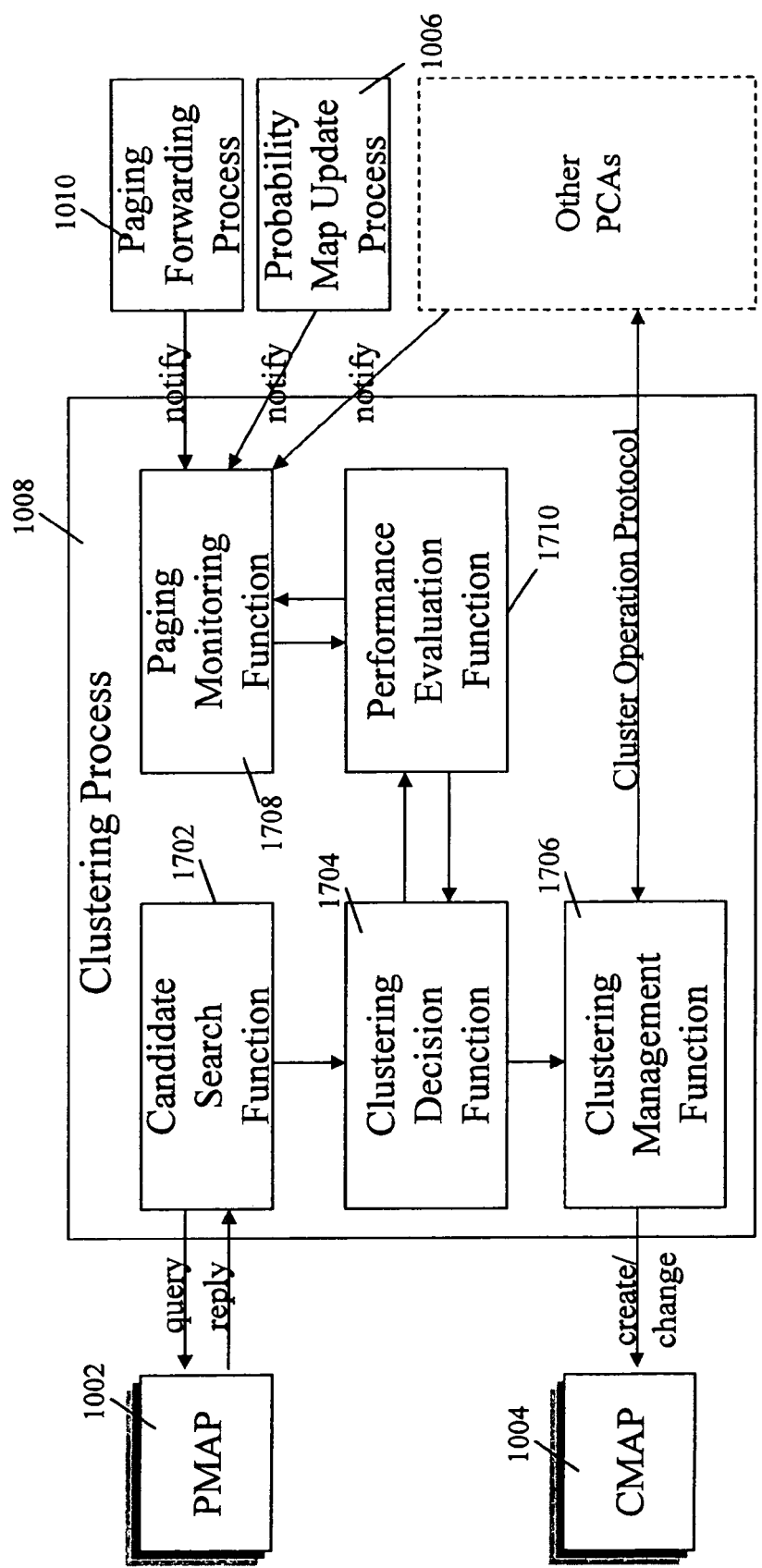
FIG. 17 is an operational block diagram of the clustering process of FIG. 10.

FIG. 17 is an operational block diagram of the clustering process 1008 of FIG. 10. The clustering process (CP) 1008 includes a candidate search function (CSF) 1702, a clustering decision function (CDF) 1704, a clustering management function (CMF) 1706, paging monitoring function (PMF) 1708 and performance evaluation function (PEF) 1710. Based on information from the PMAP 1002, the CSF 1702 locates candidate paging areas to be joined to or disjoined from other paging areas. The CDF 1704 determines, among the located candidate paging areas, which paging area should be really joined or disjoined. For example, a paging area that is allowed to have only one area ID and has already been joined to another area cannot be joined to any other paging area unless it is disjoined from the current area. The CDF 1704 may decide which area should be disjoined from the current area and joined to another area. The CMF 1706, based on the decisions made by the CDF 1704, updates the CMAP 1004. The CMF 1706 also updates the CMAPs of other areas from which it has just been disjoined and/or to which it has just been joined.

On the other hand, the PMF 1708 monitors information from the paging forwarding process 1010 that indicates frequencies of paging, and information from the probability map update process 1006 that indicates changes in MH traffic, i.e., how many MHs have moved from one area to another. The PEF 1710 evaluates the size of the current paging areas. In general, if the number of paging operations has increased, the size of the paging areas should be decreased to reduce the total cost of paging network traffic. On the other hand, the size of the paging areas should be increased if the movement traffic of MHs has increased.

Figure 18:
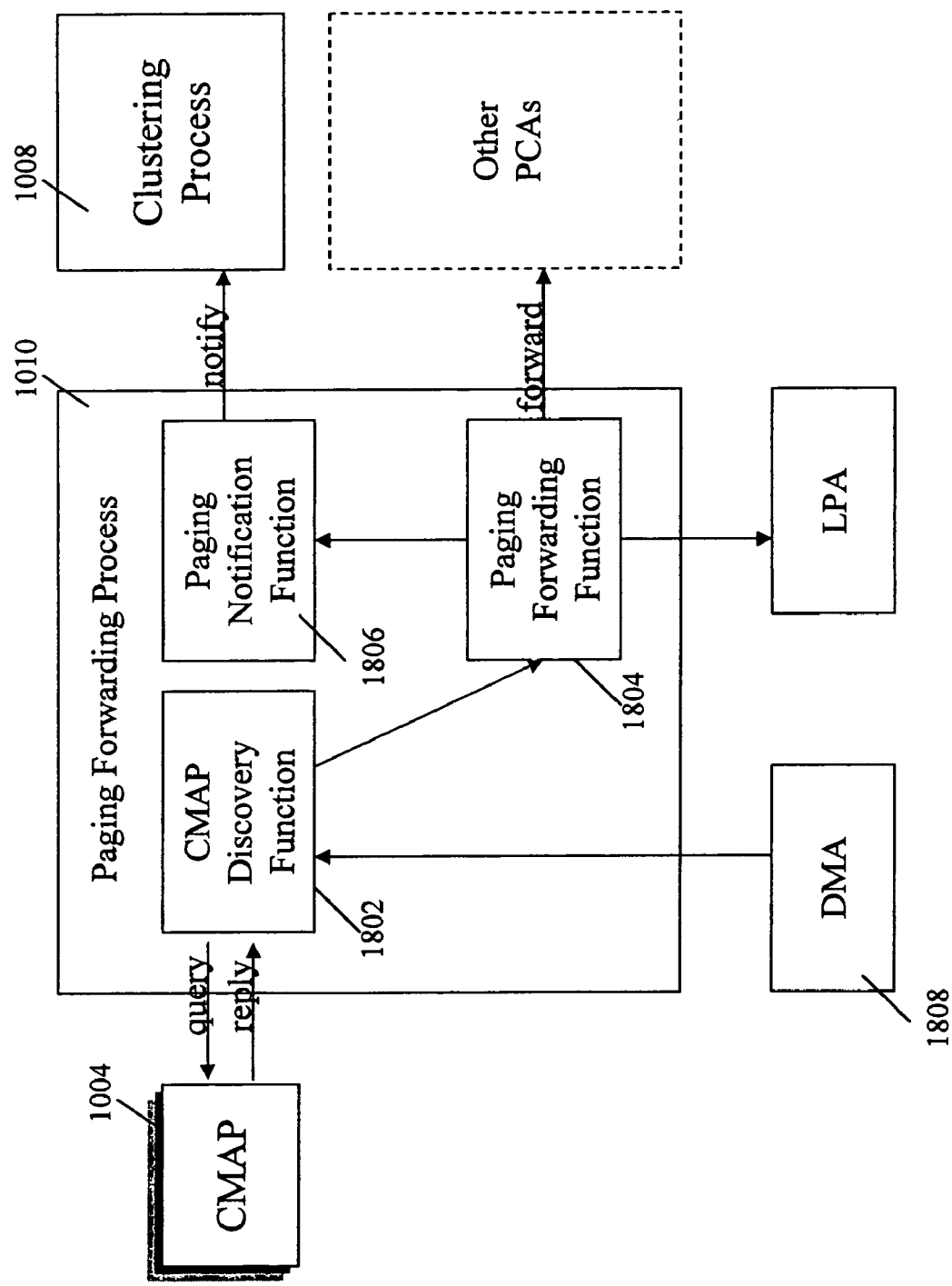
FIG. 18 is an operational block diagram of the paging forwarding function of FIG. 10.

FIG. 18 is an operational block diagram of the paging forwarding process 1010 of FIG. 10. The paging forwarding process includes a CMAP discovery function (CMDF) 1802, a paging forwarding function (PFF) 1804 and paging notification function (PNF) 1806. The CMDF 1802 receives a paging trigger packet from a dormant memory agent (DMA) operation 1808 and queries the CMAP 1004 to determine to which area the packet should be delivered. The determined area contains the MH to which the paging trigger packet was directed. The PFF 1804 forwards the paging trigger packet to the area determined by the CMDF 1802. The PNF 1806 notifies the clustering process 1008 of frequencies of paging trigger packets received from the DMA operation 1808.

Figure 19:
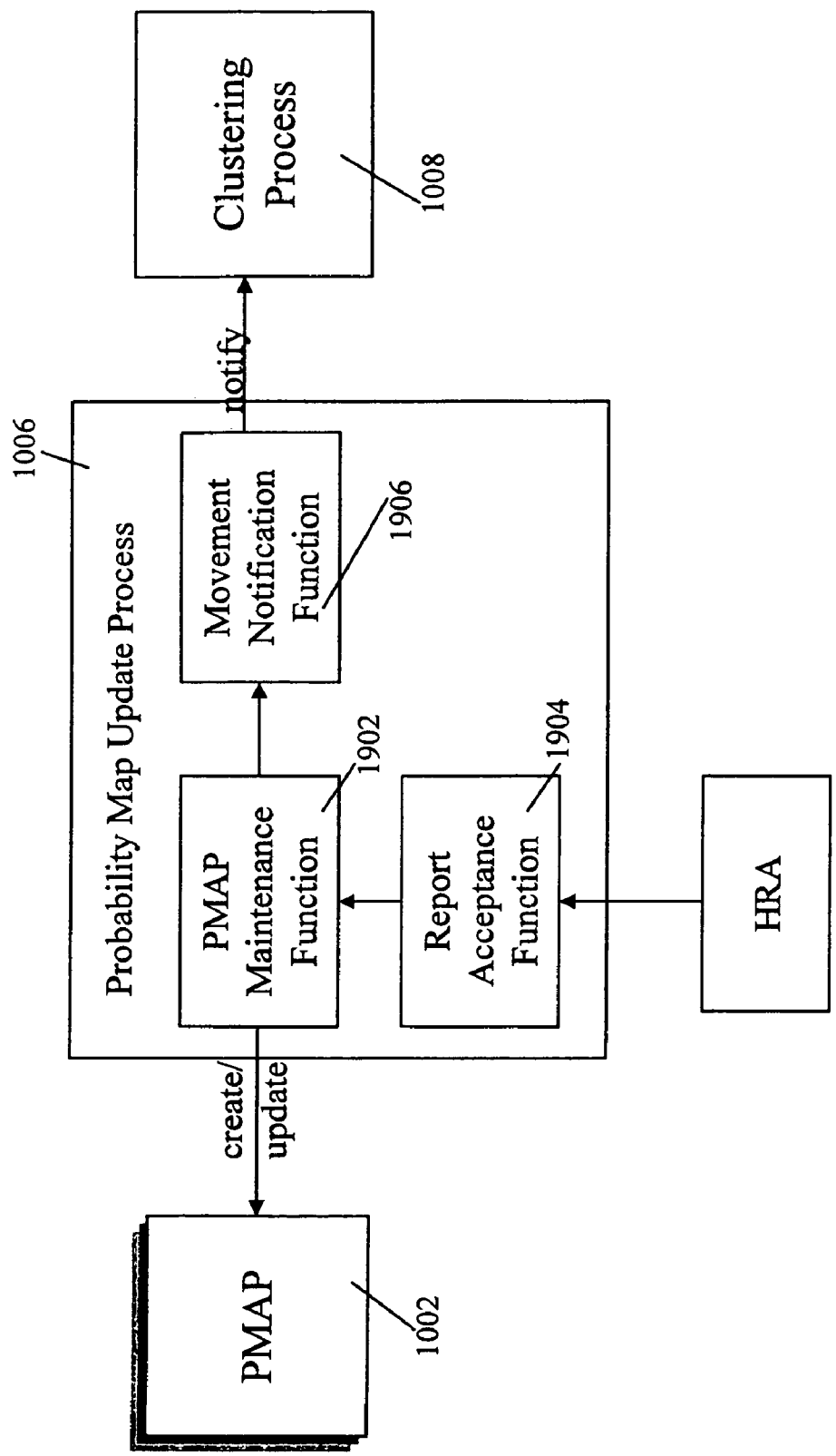
FIG. 19 is an operational block diagram of the probability map update process of FIG. 10.

FIG. 19 is an operational block diagram of the probability map update process 1006 of FIG. 10. The probability map update process 1006 includes a PMAP maintenance function (PMMF) 1902, a report acceptance function (PAF) 1904 and a movement notification function (MNF) 1406. The PAF 1904 receives a registration signal from the host reporter agent (HRA) 908 in a MH 902 (FIG. 9). Notified by the PAF 1904, the PMMF 1902 calculates statistics of MHs coming in and out and updates the PMAP 1002. The MNF 1906 determines frequencies of MHs coming in and out and notifies the clustering process 1008.

FIG. 20 is an operational block diagram of the host reporter agent (HRA) 908 in a MH 902 (FIG. 9). The HRA includes a reporter process (REPF) 2002, and a previous location table (PLT) 2004 and a current location table (CLT) 2006. As the MH travels, the REPF 2002 updates the both PLT 2004 and CLT 2006 and registers the MH with a new area. The reporter process 2002 reports paging area movement to the current paging area clustering agent. As is indicated in FIG. 20, the PLT 2004 stores the paging identifier (PID) and the network access identifier (NAI) for the previous paging area clustering agent. Similarly, the CLT 2006 stores the paging identifier (PID) and the network access identifier (NAI) for the current paging area clustering agent. When the MH moves to another paging area, the reporter process 2002 moves the current location table 2006 information to the previous location table 2004.

Figure 21:
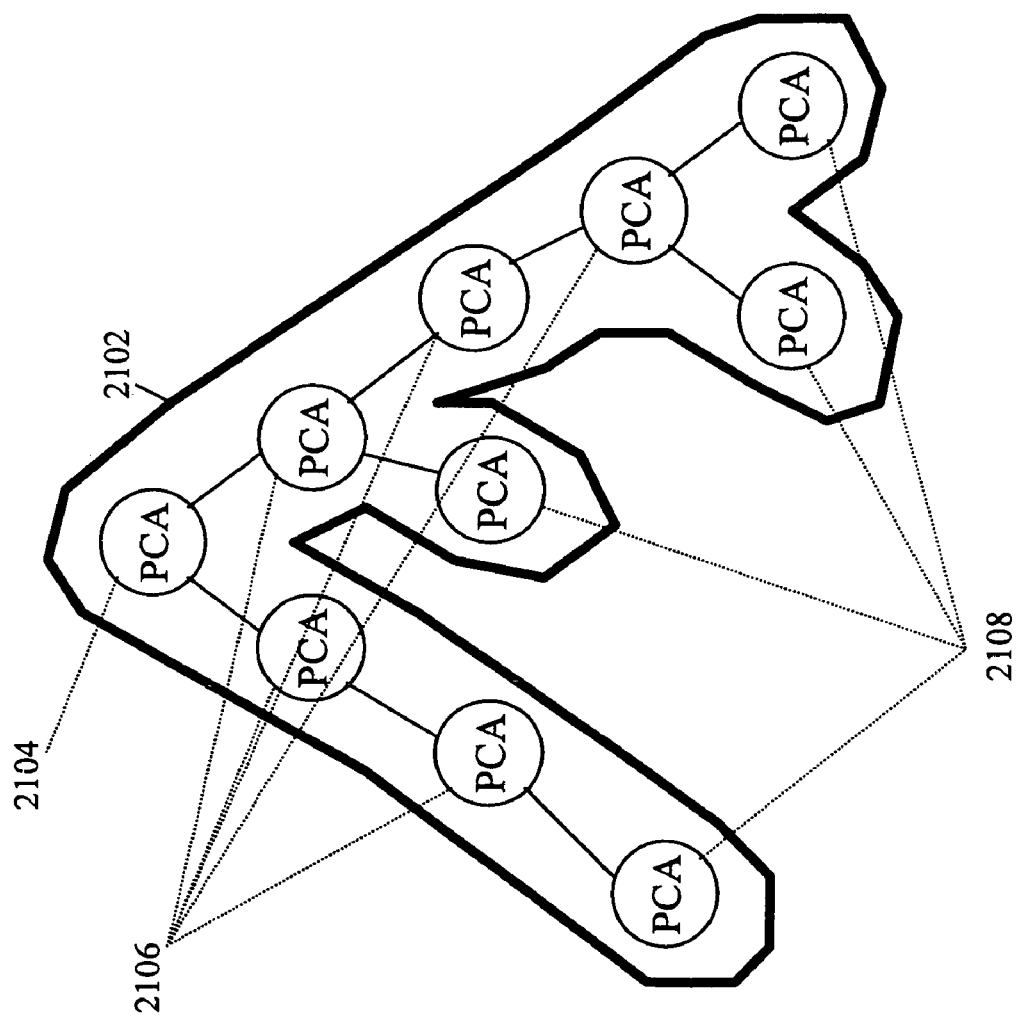
FIG. 21 illustrates clustering of paging areas represented by their paging area clustering agents.

FIG. 21 illustrates clustering of paging areas represented by their paging area clustering agents (PCAs). A cluster 2102 has one PCA to which all other PCAs in the cluster 2102 belong or are associated. Such as PCA is called the root PCA 2104. The cluster 2102 also has PCAs at which its tree structure terminates. These are referred to herein as leaf PCAs 2108. The other PCAs, between the root PCA 2104 and the leaf PCAs 2108 in the tree, are referred to as intermediate PCAs 2106.

FIGS. 22-26 illustrate clustering operations. FIG. 22 illustrates a join operation. In a join operation, a PCA which does not currently belong to any cluster joins to another PCA or a member of an existing PCA cluster. As shown in FIG. 21, PCA2 is being joined to PCA1 to form a cluster 2202. Subsequently, PCA3 is joined to the cluster 2202 of PCA1 and PCA2.

FIG. 23 illustrates a second clustering operation, called "leave." In this operation, a leaf PCA or an intermediate PCA leaves a PCA cluster. In FIG. 23, PCA3 severs itself from a cluster 2302 consisting of PCA1 and PCA2. The resulting cluster 2302 includes only PCA1 and PCA2.

FIG. 24 illustrates a third operation, called "cluster merge." In a cluster merge, a root PCA joins to a PCA or a member of a preexisting PCA cluster. In FIG. 24, a cluster 2402 consisting of PCA1, PCA2 and PCA3 are merging with a cluster 2404 consisting of PCA4 and PCA5. The merged cluster 2406 includes all of PCA1, PCA2 and PCA3, PCA4 and PCA5. PCA1 was the root cluster for cluster 2402 and is the root cluster for the merged cluster 2406.

FIG. 25 illustrates a fourth operation, called "cluster prune." In this operation, a root PCA or intermediate PCA prunes or removes successive sets of PCAs from the original cluster. PCAs of the resulting clusters become the root PCAs for the respective clusters. As shown in FIG. 25, an initial cluster 2502 results in two separate clusters 2504, 2506. Cluster 2504 consisting of PCA4 and PCA5 severs itself from a cluster 2506 consisting of PCA1, PCA2 and PCA3.

FIG. 26 illustrates a last operation, called "cluster devolution." In this operation, a root PCA leaves a cluster and transfers cluster information to a successor root cluster. In FIG. 26, PCA1 is the root PCA of the cluster 2602. PCA1 leaves the cluster 2602, leaving the other PCAs behind. PCA2 becomes the root PCA of the remaining cluster 2602.

The table below shows the messages used in one embodiment of the system and method described herein. {JOIN REQ, ALLOW JOIN, DENY JOIN} is a message set of the Join operation. {LEAVE REQ, LEAVE ACK} is a message set for the Leave operation. {PRUNE REQ, PRUNE ACK} is a message set for the Prune operation. There are no ALLOW or DENY messages for the Leave and Prune operations. The last message is used for traffic reporting. These messages are conveyed hop-by-hop through the master-slave relations in the paging clusters.

TABLE

| Protocol Messages | | | |
| --- | --- | --- | --- |
| Message | Description | Sender | Receiver |
| JOIN REQ | Sent to join a cluster | ROOT | ROOT |
| ALLOW JOIN | Permit JOIN REQ | ROOT | ROOT |
| DENY JOIN | Reject JOIN REQ | ROOT | ROOT |
| LEAVE REQ | Sent to leave a cluster | BRANCH, LEAF | ROOT |
| LEAVE ACK | Ack of LEAVE REQ | ROOT | BRANCH, LEAF |
| PRUNE REQ | Sent to prune a tree | ROOT | BRANCH, LEAF |
| PRUNE ACK | Ack of PRUNE REQ | BRANCH, LEAF | ROOT |
| PMAP REPORT | PMAP report | BRANCH, LEAF | ROOT |

Initially, the base station routers (BSRs) are isolated. All the BSRs execute procedure Main( ) in the beginning of each bootstrap round. One embodiment of procedure Main( ) is shown below. During the execution of the procedure, the BSRs are partitioned into clusters. A cluster is a set of interconnected BSRs. A cluster can include a single BSR. There is only one ROOT BSR in each cluster. For a single BSR cluster, the only member is the ROOT BSR. When a ROOT BSR retires, it stops being a ROOT and will be inactive for the rest of the ROOT algorithm, unless it becomes a ROOT again.

The procedure Main( ) calls a procedure depending on the BSR's status. If the BSR is a ROOT, it calls Root Main( ). Otherwise, it calls a procedure Other Main( ). Since this is an asynchronous distributed algorithm, a Lock mutex variable is defined to protect critical sections within a BSR.

```
Main( ) { // Main for all
1   prepare a mutex Lock;
2   variable v is this BSR;
3   while true {
4     if (v == ROOT)
5        Root Main(v);
6     else
7        Other Main(v);
8   }
9 }
```

The procedure Root_Main( ) waits for messages defined in the table above during T period. The procedure Wait_For_Input( ) is used for accepting asynchronous incoming requests. When the procedure Wait_For_Input( ) returns, it executes a procedure Root_Msg_Recv( ), which handles received messages. A constant T is assumed, such that user movement and paging traffic statistics are sampled in T period. A choice of T can be set by operators.

After the time period T, the procedure Root_Main( ) calls procedure Root_Trigger( ). This procedure decides whether the ROOT BSR takes a join or prune action. The procedure Root_Trigger( ) is described in greater detail below.

```
Root_Main(v) { // Main for ROOT
1   var_BSR u;
2   t_0 = current_time( );
3   while(current_time( ) - t_0 T period){
4      Wait_For_Input(&Root_Msg_Recv( ),timeout);
5   }
6   switch(Root_Trigger(v,PMAP,&u)) {
7      case JOIN :
8         Join(u,v); break ;
9      case PRUNE :
10        Prune( ); break ;
11     case default :
12        break;
13  }
14  return;
15 )
```

The procedure Root_Msg_Recv( ) is called in the procedure Root_Main( ). It processes received messages. A PMAP REPORT message is received from a slave BSR. All of the PMAP information within a cluster must be reported to the ROOT BSR so that it can detect all the neighboring paging areas. A JOIN REQ message comes from another ROOT BSR, which requests to join to the cluster. The message JOIN REQ must contain the requesting ROOT BSR's current PA-ID to prevent a master-slave looping. A LEAVE REQ message comes from a slave BSR, which requests to leave the cluster. The procedure Root_Msg_Recv( ) also needs to acquire the lock after it receives a message to avoid data inconsistency. If it fails to acquire the lock, it just sends an error message to the previous sender.

```
Root_Msg_Recv(v) { // Message handler for ROOT
1   msg = receive( );
2   if(acquire(Lock) == true) {
3     switch(msg.type) {
4        case PMAP_REPORT:
5           PMAP msg.body; break;
6        case JOIN REQ:
7           Join_hdr(msg,v); break;
8        case LEAVE_REQ:
9           Leave_hdr(msg,v); break;
10    }
11    release(Lock);
12  } else {
13     send(msg.sender, ERROR);
14  }
15 }
```

The procedure Join_hdr( ) handles a join request from another ROOT BSR. Since this is a distributed procedure, it might have old information about the neighboring paging areas. The procedure fetches neighbor information by requiring PMAPs of the current slaves. Then, the ROOT calculates CostChange( ), a procedure which is described below in detail. If the result of the procedure CostChange( ) is positive, the Join_hdr( ) procedure checks the maximum size K of the cluster. If the size of the cluster is below K, the ROOT BSR allows to join. Then, it must update the tree topology and neighbor information related to the join operation. Finally the ROOT BSR sends out the ALLOW JOIN message to the sender. Otherwise, it replies by DENY JOIN. This procedure also must be carried out within the mutex lock.

```
Join_hdr(msg,v) { // Join request handler
1   fetch current PMAP info from slaves;
2   if (CostChange(v) == positive) {
3      if (total size of the cluster   K)  {
4         msg.sender added to the cluster ;
5         Update topology information;
6         Update neighbor information;
7         send(msg.sender, ALLOW_JOIN); return;
8      } else
9         send(msg.sender, DENY_JOIN); return;
10   else
11      send(msg.sender, DENY_JOIN); return;
12 }
```

The Leave( ) procedure deals with a leave request. A ROOT BSR allows a BRANCH and LEAF BSRs to leave at anytime. The Leave( ) procedure updates the tree topology by cutting off the requester. After that, the ROOT BSR just sends an acknowledgement.

```
Leave-hdr(msg,v) { // Leave request handler
1   msg.sender removed from the cluster;
2   send(msg.sender, LEAVE_ACK);
3 }
```

The Join( ) procedure is called after the ROOT BSR decides to join to another cluster. It must acquire the lock before sending the message. If the other ROOT BSR allows the ROOT BSR to join, the requester receives an ALLOW_JOIN message. Then, the requester ROOT BSR retires from a ROOT and starts being a BRANCH or LEAF.

```
Join(u,v) { // Join request sender
1   if (acquire(Lock) == true) {
2       send(u,JOIN_REQ);
3       msg = receive( );
4       if (msg.type == ALLOW_JOIN) {
5           v retires from root;
6           release(Lock);
7           return;
8       } else if (msg.type == DENY_JOIN) {
9           release(Lock);
10          return;
11      }
12      } else
13      return;
14  }
```

The procedure Prune( ) is called after the ROOT BSR decides to prune some of the BRANCH trees or LEAFs within the cluster. This prune decision is made in Root Trigger( ), which is described below.

```
Prune(v) { // Prune request sender
1   if (acquire(Lock) == true) {
2       for each remaining w 2 v's slaves;
3           send(w,PRUNE_REQ);
4           msg = receive(w);
5           if (msg.type == PRUNE_ACK)
6               Separate w;
7           else
8       return;
9   }
10 }
```

The procedure Other Main( ) is for the BRANCH and LEAF BSRs. After the time period T, it sends a PMAP report to its ROOT BSR. The BRANCH and LEAF BSRs are allowed only one voluntary operation, Leave. The procedure Others_Trigger( ) decides to leave or stay in the current cluster, which is described below. Once a BSR decides to leave, it sends a LEAVE_REQ message to the ROOT BSR. If the requesting BSR receives a permission from the ROOT BSR, it updates the topology and neighbor information. Note that the leave operation is not allowed when the BSR is in the ROOT status.

```
Other_Main(v){ // BRANCH and LEAF's Main
1   t_0 = current time( );
2   while(current time( ) - t0 T period){
3     Wait For Input(&Other_Msg_Recv,timeout);
4   }
5   send(master,PMAP_info);
6   if (Leave_Trigger(PMAP,v) == negative){
7       acquire(Lock);
8       Send(ROOT,LEAVE_REQ)
9       msg = receive(ROOT);
10      if (msg.type == ALLOW_LEAVE) {
11          Update topology information;
12          Update neighbor information;
13          release(Lock);
14          return;
15      };
16      release(Lock);
17      return;
18  }
19 }
```

The BRANCH and LEAF BSRs are supposed to accept four messages during the period T. When a BRANCH or LEAVE BSR receives a JOIN_REQ and LEAVE_REQ message, it simply forwards to the master BSR. If a BSR receives the message FETCH_REQ, it sends back its PMAP information to the requester. When a BSR receives PRUNE REQ it executes Prune( ) operation to leave from the current cluster with slave BSRs beneath. Note that in the voluntary leave, the BSR leaves without the slaves. However in the prune, the BSR leaves with the slave BSRs.

```
Other_Msg_Recv(v) { // Message handler for Others
1   msg = receive( );
2   if(acquire(Lock) == true){
3       switch(msg.type) {
4           case JOIN_REQ
5               send(master,msg); break;
6           case LEAVE_REQ
7               send(master,msg); break;
8           case PRUNE_REQ
9               Prune(v); break
10          case FETCH_REQ
11              send(msg.sender,PMAP); break;
12      }
13      else
14          send(msg.sender, ERROR);
15  }
16  release(Lock);
17 }
```

Trigger functions utilize statistical tables made by the traffic samplings described above. A ROOT BSR can decide whether to join another cluster or to prune the tree.

```
Root_Trigger(v,PMAP,*u) {
1   var int max,min,tmp;
2   var_BS w;
3   neighbor_list  find_PAneighbors(PMAP);
4   if (Cost(v) > PruneThreshold){
5       return prune;
6   }
7   for each remaining W ∈ neighbor_list {
8       tmp = CostChange(w) ;
9       if (min > tmp) {
10          min = tmp;
11          u    w;
12      }
13      if (min < JoinThreshold) {
14          u removed from neighbor list;
15          return join;
16      }
17  }
18 }
```

In the beginning, Root_Trigger( ) tries to find neighboring paging areas by using collected PMAP. Then, it begins to calculate a prune trigger. If the paging cost exceed a certain limitation, the paging area size should be reduced so that it won't occupy too much wireless bandwidth. If the result of Cost( ), which is described below is larger than the value of the variable PruneThreshold, all the branches are untied to be independent BSRs.

Next, Root_Trigger calculates the join trigger. A ROOT BSR is able to know all the slave's PMAP, which is reported from the slave to its root. The collected PMAP provides the ROOT BSR the marginal probability distribution of neighboring paging areas. The join trigger searches all the possible neighbors by looking up PMAP. For each candidate, it calculates function Cost_Change( ), which is described below. Root_Trigger( ) searches minimum cost join candidate. If the candidate is below the value of the variable JoinThreshold, the ROOT base station decides to join to it.

If the value of the variable JoinThreshold is set large enough, a ROOT BSR learns to joins to others faster.

The procedure Leave_Trigger( ) is the only operation that non-ROOT BSRs execute. Every BSR maintains its PMAP and if the BSR estimates the movement within the current cluster is lower than another paging area, it tries to leave the current cluster.

```
Leave_Trigger(PMAP,v){
1   refresh PMAP information;
2   for each remaining w ∈ PMAP {
3       if (current cluster is lower than w)
4           return negative;
5   }
6   return positive;
7 }
```

Initially, the procedure Leave_Trigger( ) refreshes PMAP information. Then, the BSR compares the marginal probability distributions in PMAP with that of current cluster. If the value for the current cluster is lower than the others, it decides to leave by returning a negative value. Otherwise, it remains in the same cluster.

Note that when two cells are in same paging area, then a dormant mode user will not update its location information when it moves between those two cells. This is because a mobile host will not enter the active mode until it hears a different PA-ID. As a result, no location update message with which the user traffic is monitored will be sent. This may be referred to as a hidden movement problem. When the inner traffic pattern has changed, the old pattern may become costly, as cost is used herein. Under these circumstances, the BSR must be able to detach itself from the old paging area so that it can choose the best new paging area to join. In order to solve this problem, a simulated annealing method is proposed. In every entry refresh in PMAP, a BSR calculates the following equation:

$$\tau_{p,v}(t+1) = (1-\rho)\tau_{p,v}(t)$$

where $\tau_{p,v}(t)$ is the current traffic information and $\rho \in [0,1]$ is a configurable constant which decides how fast the cell becomes independent.

The meaning of this equation is straightforward. If a boundary disappeared since the cell joined a paging area, the algorithm assumes the traffic on that boundary begins to decline. When the $\tau_{p,v}(t+1)$ is lower than a certain threshold, the algorithm will make the cell independent to perform the join action again. As a result, after a certain period, the cell will become independent. When a cell finds there is no different paging area on its boundaries, the annealing algorithm will not be performed.

The algorithm described herein depends on the proper trigger to join/leave paging areas. Since one of the targets of dynamic paging area construction is to minimize the overall paging cost, it is natural to use a cost function as the trigger. As discussed above, the overall paging cost can be divided into two parts, the paging cost and location update cost.

Paging Cost

The paging cost is defined as the bytes/sec which are transmitted within a paging area when an incoming call is received. The paging cost can be further divided into two types: the cost for wired and the cost for wireless channels. In order to measure the paging cost, the following parameters are defined:

PAi—the ith Paging Area
Ri—the incoming call rate of paging area i (PAi) (call/sec)
Cp—the paging cost in a cell for a call (bytes/(call-cell))
Ncells(i)—The number of cells in the paging area i (cell)

Furthermore, $\alpha C_p$ is the cost of sending a paging request from a router to another, and $\beta C_p$ is the cost of broadcasting a paging request on the air. $\alpha$ and $\beta$ are weights for wire and wireless transmission. For each incoming call for PAi, we assume that the paging message is transmitted only once to each cell and then broadcasted on the air. The paging cost is then described in the following equation:

$$\text{Cost}_{incoming}(i) = R_i \times (\alpha+\beta) \times N_{cells} \times C_p$$

Location Tracking Cost

When a user moves from his old PAj into a new PAi, it has to update the location information. The Location Update Cost is defined as number of bits that are transmitted per-second when a user crosses the boundaries separating two different paging areas. Note that if two cells are in the same paging area when a user crossed the boundaries of these two cells, the user will not update the information. In order to measure this location update cost, the following parameters are defined:

pji—the rate of users moves from PAj to PAi.(usersec)
pij—the percentage of users moves from PAi to PAj. (user-sec)
dBSRi;TAi—The average distance, i.e. number of hops, between the BSR and TA in PAi (hops)
dBSRi;DMAi—The average distance, i.e. number of hops, between the BSR and DMA in PAi (hops)
Cu the location update cost per hop (bytesuserhop)
N(i) the set containing the paging area adjacent to PAi, does not include PAi.

For each paging area i $$\text{Cost}_{location-update}(i) = \sum_{j \in N(i)} 2p_{ji}[\alpha(d_{BSR_i,TA_i} + d_{BSR_i,DMA_i}) + \beta]C_u$$

Total Paging Cost

Based on the cost functions presented herein, the total cost during a certain time period is defined as follows:

$$\text{Cost} = R_i \times (\alpha + \beta) \times N_{cells} \times C_p + \sum_{j \in N_i} 2p_{ji}[\alpha(d_{BSR_i,TA_i} + d_{BSR_i,DMA_i}) + \beta]C_u$$

Based on this equation, 3 parameters, incoming call rate, size of the paging area, and traffic information between two paging areas contribute to the total cost significantly. Next, the relationship between these parameters and dynamic paging area construction is analyzed.

Traffic Pattern

Based on the cost function, it can be seen that the traffic between two paging areas contributes to the paging cost significantly. Intuitively, when the traffic between two different paging areas is heavy enough, by combining two cells, it is possible to reduce the overall paging cost since less location update information is transmitted. Based on this fact, triggering of the join action will be analyzed.

Consider two paging areas, i,j, which are adjacent to each other. Then based on the cost function above, during a fixed period, the cost of paging area i is $$\text{Cost}_i = R_i \times (\alpha + \beta) \times N_{cells}(i) \times C_p + \sum_{k \in N(i)} 2p_{ki}[\alpha(d_{BSR_i,TA_i} + d_{BSR_i,DMA_i}) + \beta]C_u$$

The total cost during period T is cost=cost$i$+cost$j$

After we combine the two PAi and PAj, during the same period of T, the total cost is $$\text{Total} = (R_i + R_j) \times (\alpha + \beta) \times ((N_{cells}(i) + N_{cells}(j)) \times C_{p+}) + \sum_{k \in N(i) \cup N(j), k \neq j,i} 2p_{ki}[\alpha(d_{BSR_i,TA_i} + d_{BSR_i,DMA_i}) + \beta]C_u$$

Subtract from the total paging cost before combining them together $$\text{Cost}_{change} = ((R_i N_j + R_j N_i) \times (\alpha + \beta) \times C_p$$

$$-2p_{ji}[\alpha(d_{BSR_i,TA_i} + d_{BSR_i,DMA_i}) + \beta]C_u$$

$$-2p_{ij}[\alpha(d_{BSR_i,TA_i} + d_{BSR_i,DMA_i}) + \beta]C_u$$

If the distance is similar, we then have the following equation $$\text{Cost}_{change} = ((R_i N_j + R_j N_i) \times (\alpha + \beta) \times C_p$$

$$-2p_{j,i}[\alpha(d_{BSR,TA} + d_{BSR,DMA}) + \beta]C_u$$

where pi;j=pij+pji and it represents the all the traffic between the two different paging areas. It is clear that when the Cost$_{change}$ is less than 0, by combining two paging areas, the overall paging cost can be reduced. The combination process only impacts the overall paging cost of the two paging areas involved.

Incoming Call Rate

Triggering of the join action was discussed above. In some situations, the upper bound for the paging cost is fixed. For example, the operator can set the upper bound of the cost function so that it won't occupy too much wireless bandwidth. This situation can be referred to as a Fixed Energy Budget environment. When the paging area is stabilized and the incoming rate increases significantly, by reducing the size of the paging area, the cost can be reduced to the original level. In the presently disclosed embodiments, the prune action is always triggered under this circumstance.

FIGS. 27-35 illustrate communication during clustering operation procedures. In the illustrated embodiment, there are six procedures: a movement report procedure, the join procedure, the leave procedure, the cluster merge procedure, the cluster prune procedure and the cluster devolution procedure. Each of these will be described in turn.

Figure 27:
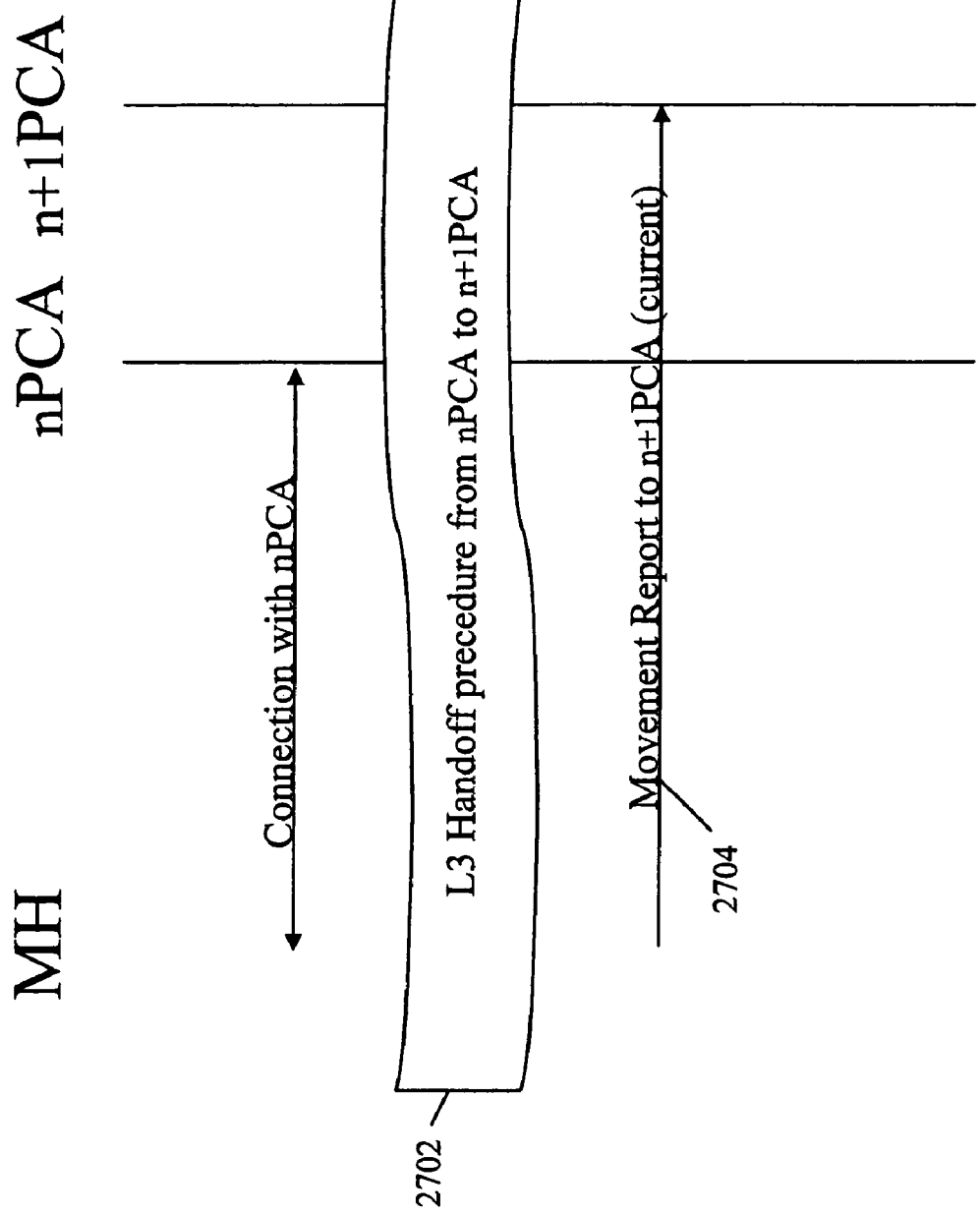
FIGS. 27-35 illustrate communication during clustering operation procedures.

FIG. 27 illustrates communication during a movement report procedure. As show in FIG. 27, a mobile host (MH) is currently registered in a communication network with a last hop router of the network, designated nLHR. The MH travels and conducts 2702 a layer 3 hand-off from nLHR to a last hop router designated n+1LHR. Any conventional hand-off procedure suitable for the communication network may be used. The MH then reports 2704 its movement into the n+1LHR or registers with the n+1LHR.

Figure 28:
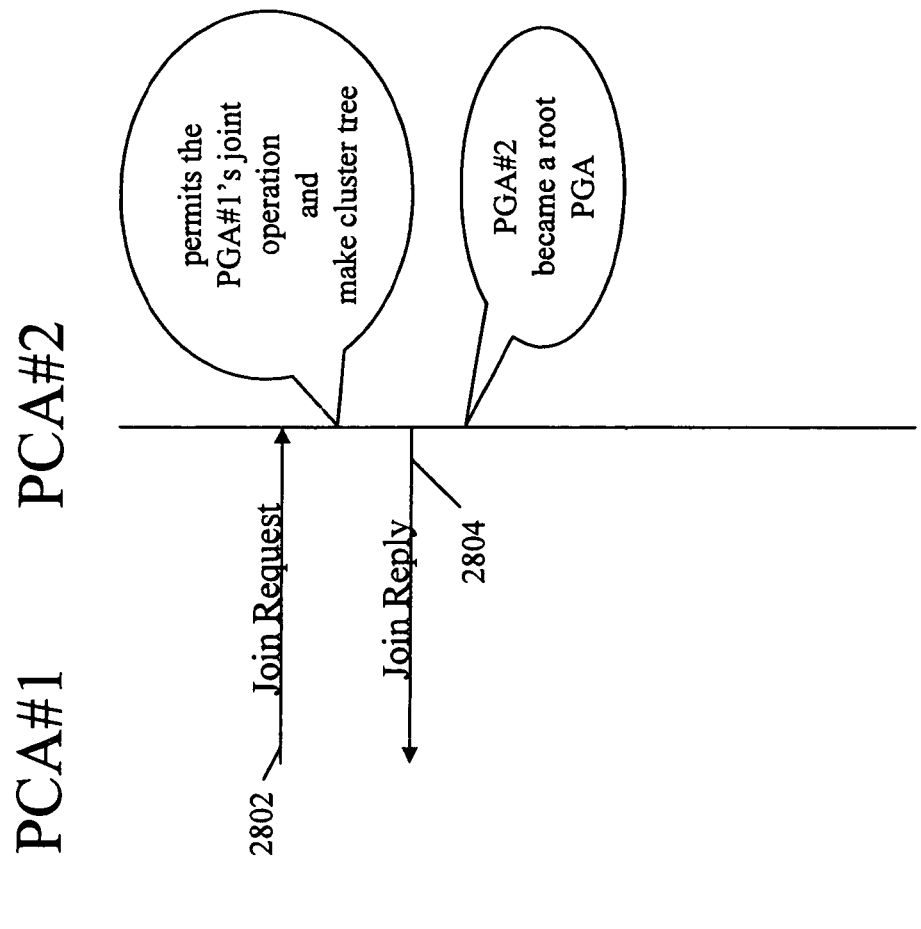
Figure 29:
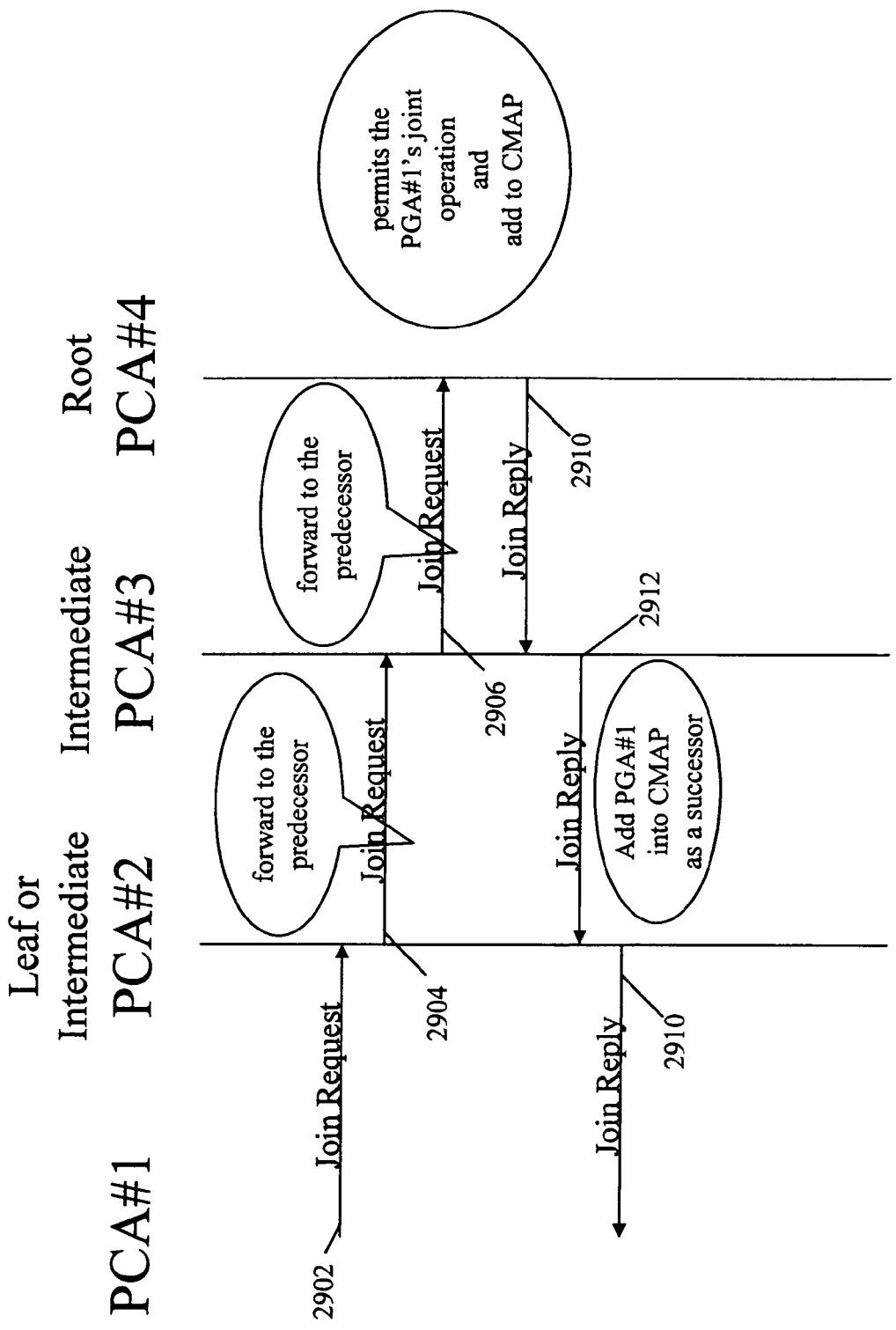

FIGS. 28 and 29 illustrate the second procedure, the "joining procedure." In FIG. 28, PCA1 is joining to PCA2. PCA1 first sends 2802 a request to join to PCA2. If PCA1 is allowed to be joined, PCA2 sends 2804 a reply to PCA1 accepting the joining PCA1. After being joined with PCA1, PCA2 becomes a root PCA. PCA2 switches from the default information (FIG. 14) to the root information (FIG. 16) and updates the root information to add PCA1 to the root information as a subordinate PCA. PCA1 becomes dependent from PCA2.

PCA1 switches from the default information to the branch information (FIG. 15) to add PCA2 to it as its root PCA.

One PCA may join a cluster of PCAs. As shown in FIG. 29, PCA1 is about to join a cluster consisting of PCA4, PCA 3 and PCA2. In this cluster, PCA4 is the root PCA, PCA3 is an intermediate PCA, and PCA2 is a leaf PCA. PCA1 first sends 2902 a join request to PCA2. Retrieving its cluster map (CMAP), PCA2 forwards 2904 the request to its immediate predecessor PCA3, which likewise forwards 2906 the join request to the root PCA, PCA4. If joining of PCA1 is acceptable, PCA4 sends 2910 a reply accepting joining with PCA1. This reply is forwarded 2912 though PCA3 and forwarded 2914 through. PCA2 to PCA1. PCA4, PCA3 and PCA2 add PCA 1 to their CMAPs as a distal PCA connected to PCA2 in their tree structure.

Figure 30:
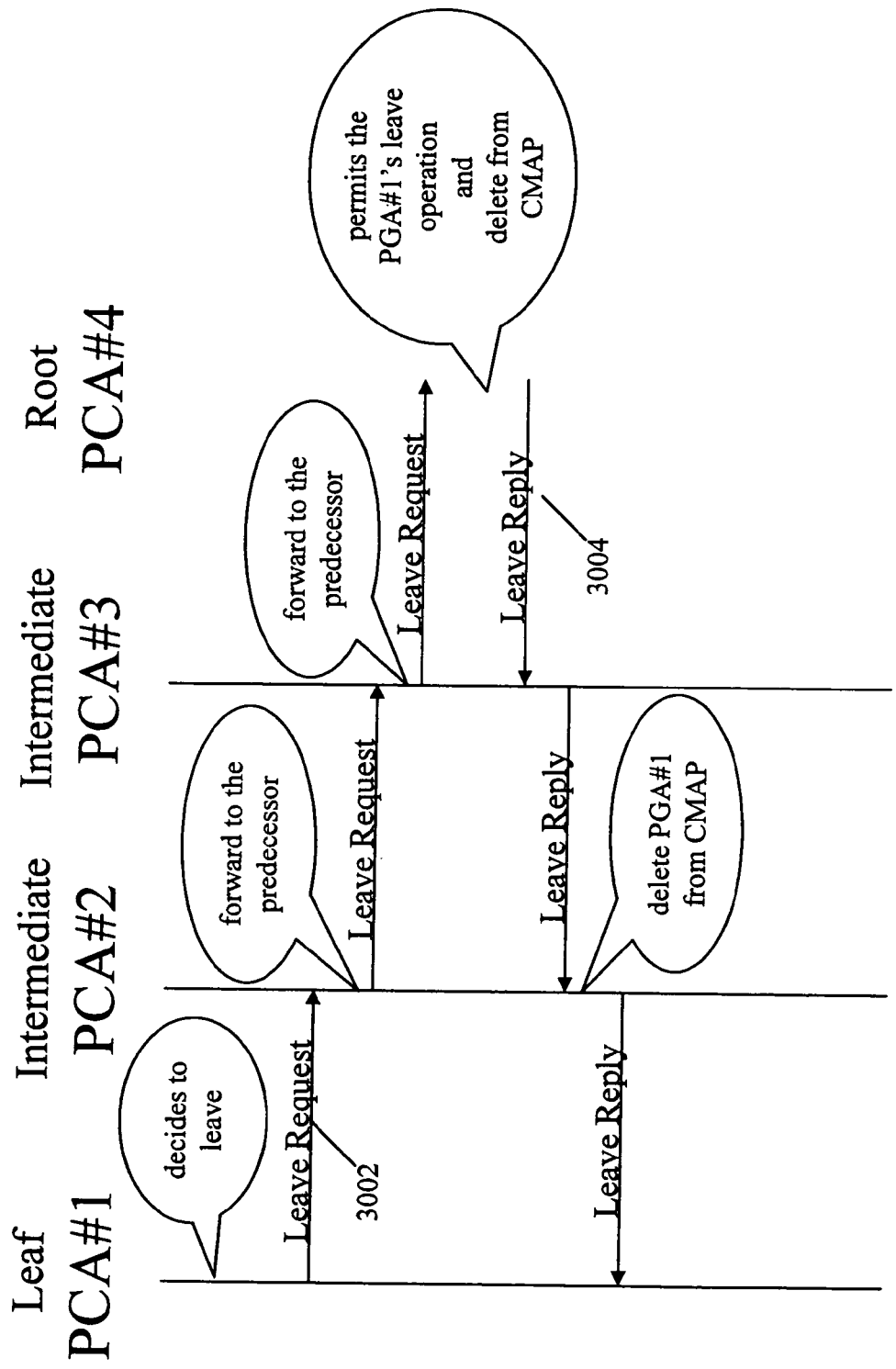
Figure 31:
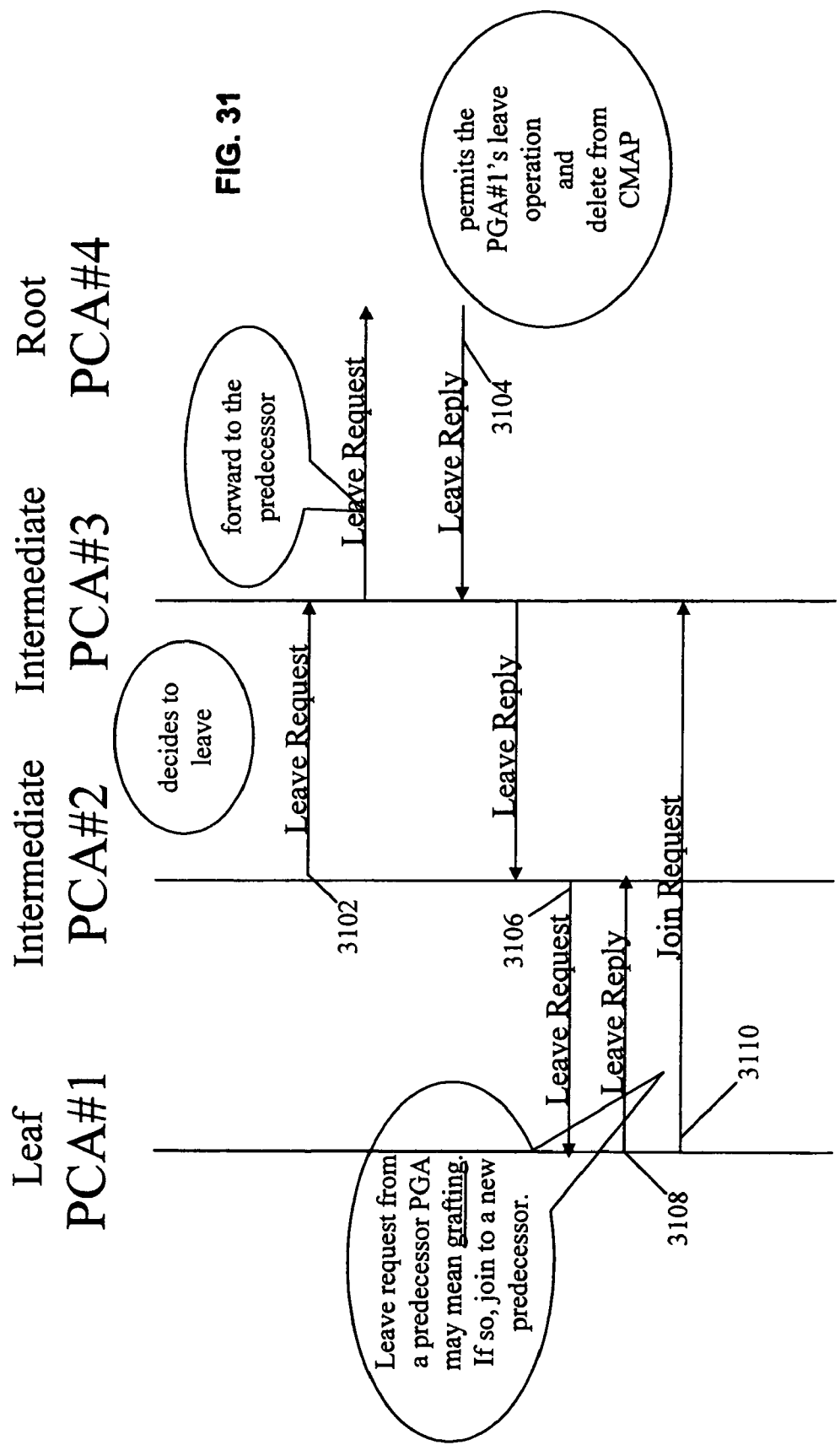
Figure 32:
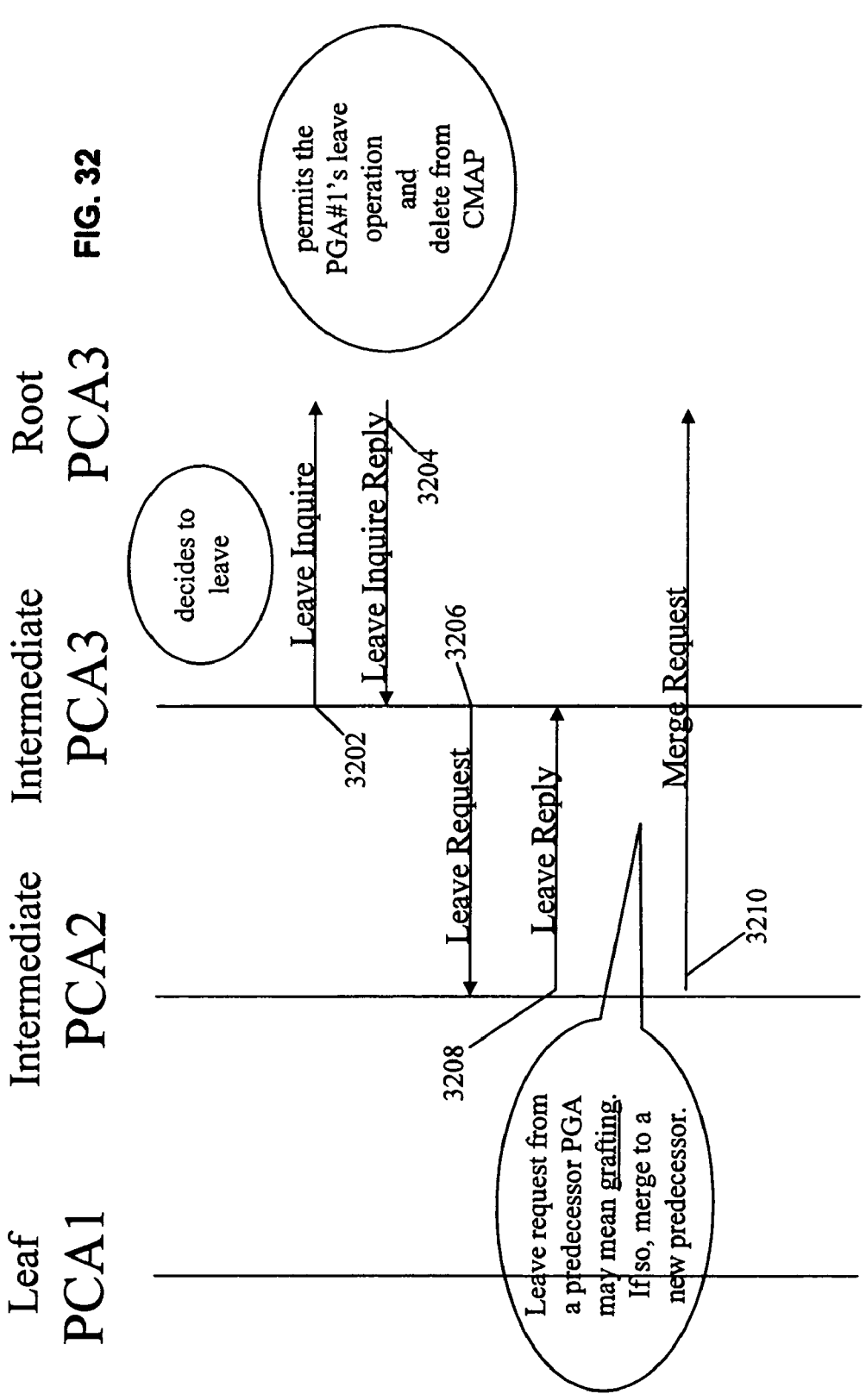

The third procedure is called a "leave procedure." FIGS. 30-32 illustrate examples of the leave procedure. In FIG. 30, PCA4, PCA3, PCA2 and PCA1 form a cluster in which PCA4 is a root PCA, PCA1 is a leaf PCA, and PCA3 and PCA2 are intermediate PCAs. PCA1 is about to sever itself from the cluster. A request from PCA1 is forwarded 3002 to PCA4 though intermediate PCAs 2 and 3. PCA4 in return sends 3004 a reply to PCA1 through the same path in the reverse direction. After PCA1 is severed from the cluster, PCA4, PCA3 and PCA2 delete PCA1 from the cluster tree in their CMAPs.

FIG. 31 shows another example of the leave procedure in which PCA2 is severing itself from the cluster. PCA2 sends 3102 a request to PCA4 through PCA3. PCA4 in response returns 3104 a reply to PCA2 through PCA3. In the meantime, PCA2 also sends 3106 the same request to PCA1, which returns 3108 a reply back to PCA2. After PCA2 is severed from the cluster, PCAs 4 and 3 delete PCA2 from the cluster tree in their CMAPs. PCA1 switches to the default information and then sends 3110 a request to join to PCA3. The procedures for joining PCA1 to the cluster consisting of PCA3 and PCA4 are the same as described above.

FIG. 32 shows another example of the leave procedure in which PCA3 is severing itself from the cluster. PCA3 sends 3202 a request to disjoin to PCA4. PCA4 returns 3204 a reply to PCA3. In the meantime, PCA3 sends 3206 the same request to PCA2, which returns 3208 a reply to PCA3. After PCA3 is severed from the cluster, PCA4 switches back to the default information. PCA2 then sends 3210 a request to merge to PCA4. The procedures for merge are already described above.

Figure 33:
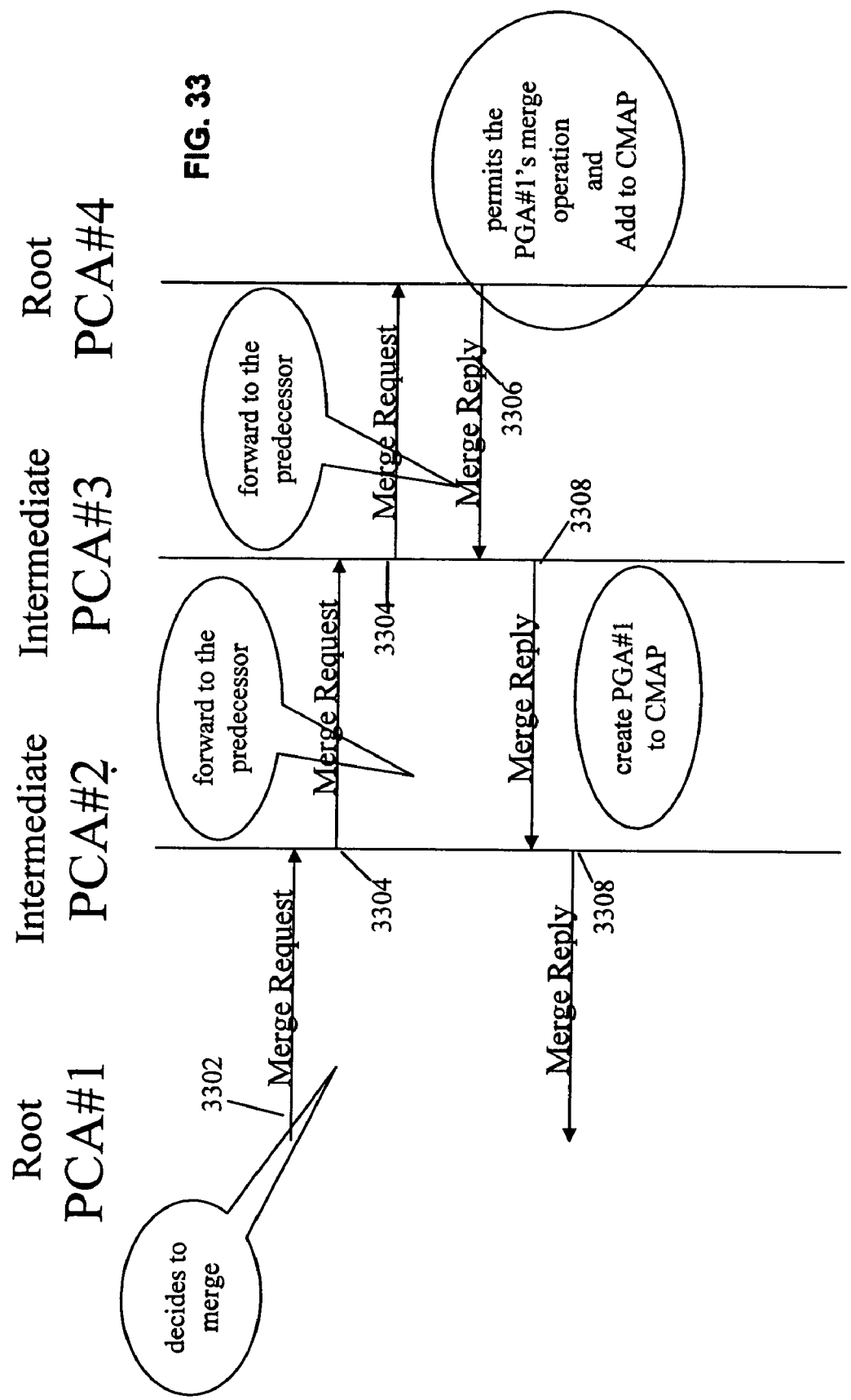

FIG. 33 illustrates the fourth procedure, called a "cluster merge procedure." As shown in FIG. 33, a cluster including PCA1 is merging to a cluster consisting of PCA4, PCA3 and PCA2. PCA4 is the root PCA in the merged cluster. The merging cluster may include other PCAs than PCA1, which is the root PCA in the merging cluster. PCA1 sends 3302 a request to merge to PCA2, which forwards 3304 the request to PCA4 through PCA3. If the merge is not going to violate any overlapping constraint or other constraints, PCA4 returns 3306 a reply to PCA1 which is forwarded 3308 through intermediate PCAs 3 and 2. After the merge is completed, PCA4, PCA3 and PCA2 update their CMAPs to add the merging cluster including PCA1 that becomes subordinate to PCA2. Likewise, the PCAs in the merging cluster also update their CMAPs.

Figure 34:
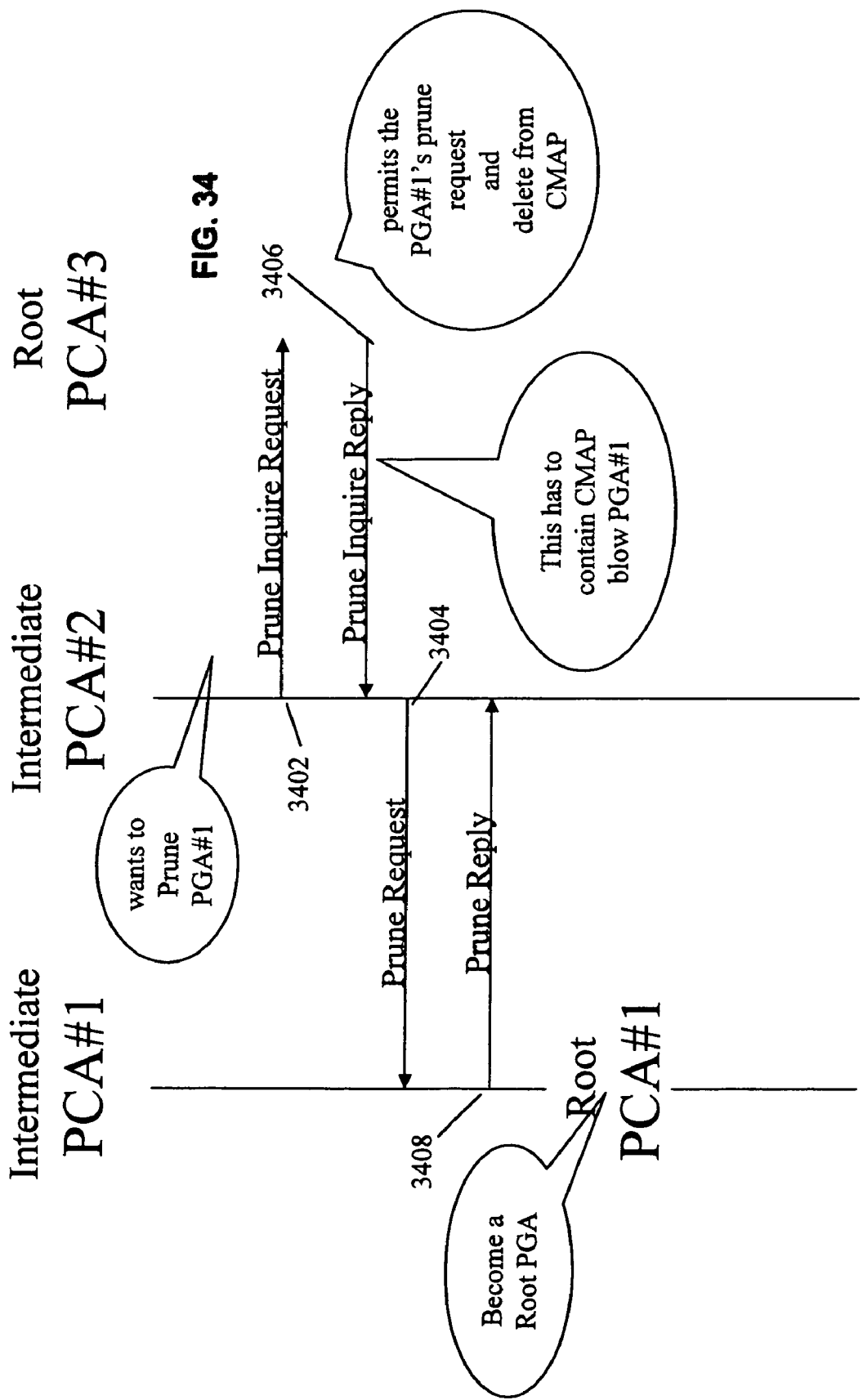

The fifth procedure is called a "cluster prune procedure." In FIG. 34, there exists a cluster consisting of PCA3, PCA2 and PCA1, where PCA3 is the root PCA, and PCA2 and PCA1 are intermediate PCAs. PCA2 wishes to sever PCA1 and itself from PCA3. PCA2 also wishes PCA1 to become the root PCA of the resulting cluster. PCA2 sends 3402 a request to prune to PCA3 and sends 3404 a request to PCA1. If the prune is acceptable, PCA3 and PCA1 send 3406, 3408 replies to PCA2. PCA1 and PCA2 are first severed from PCA3. PCA3 switches back to the default information. PCA1 then becomes a root PCA, and PCA2 becomes subordinate to PCA1. PCA1 switches to the root information including PCA2 as a subordinate.

Figure 35:
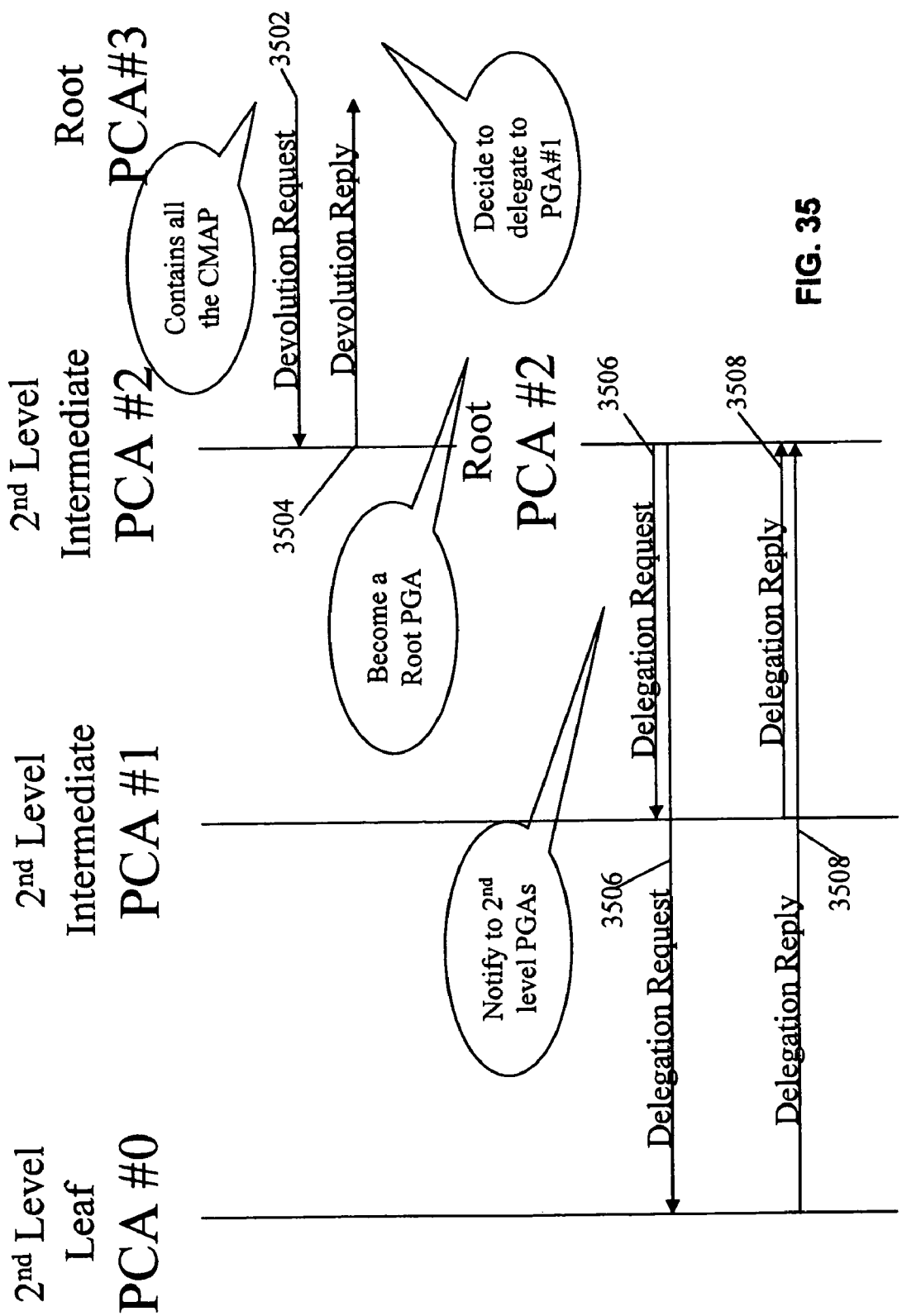

The last procedure is called a "cluster devolution procedure." In FIG. 35, there is a cluster consisting of PCA3, PCA2, PCA1 and PCA0. In this cluster, PCA3 is the root PCA of the cluster. PCA2 and PCA3 are subordinate to PCA3 at the same level. PCA0 is dependent from PCA1. PCA3 is severing itself from the cluster and sends 3502 a request to server itself to PCA2. The request includes the information in the CMAP of PCA3 that indicates the tree structure of the cluster. PCA2 returns 3504 a reply to PCA3. Then, PCA1 severs itself from the cluster. At the same time, PCA2 becomes the root PCA. If PCA3 wishes PCA1 to become a root PCA, it may send the same request to PCA1, instead of PCA2. PCA2, as the root PCA, notifies 3506 PCA1 and PCA0 of the cluster structure. In return, PCA1 and PCA0 send 3508 an acknowledgement to PCA2.

While a particular embodiment of the present invention has been shown and described, modifications may be made. It is therefore intended in the appended claims to cover such changes and modifications which follow in the true spirit and scope of the invention.

The invention claimed is:

1. A method of operating a mobile host in a telecommunication system, the method comprising:
   receiving at the mobile host current paging area identification information of a first paging area from a first access point, wherein the current paging area identification information indicates where the mobile host is currently traveling;
   transmitting location information from the mobile host to the first access point of the telecommunication system, wherein the first access point corresponds to the first paging area;
   storing the current paging area identification information of the first paging area as a current location of the mobile host;
   receiving at the mobile host subsequent paging area identification information of a second paging area, wherein the second access point corresponds to the second paging area, wherein the subsequent paging area identification information indicates where the mobile host is subsequently traveling relative to the first paging area;
   upon detecting a location change of the mobile host,
      storing the current paging area identification information of the first paging area as a previous location of the mobile host;
      storing the subsequent paging area identification information of the second paging area as the current location of the mobile host; and
      transmitting a movement report to the second access point of the telecommunication system from the mobile host, wherein the movement report comprises the current location and the previous location of the mobile host.

2. The method of claim 1 wherein receiving the current paging area identification information comprises receiving a first paging area identifier transmitted by the first access point of the telecommunications network, the first paging area identifier being for a current paging area associated with the transmitting first access point.

3. The method of claim 1 further comprising:
   comparing the subsequent paging area identification information with the stored current paging area identification information; and
   when the subsequent paging area identification information does not match the stored current paging area identification information, transmitting the movement report to the second access point.

* * * * *